(12) United States Patent
Stanesic et al.

(10) Patent No.: US 9,156,406 B2
(45) Date of Patent: Oct. 13, 2015

(54) MODULAR RAIL AND STEP SYSTEM

(71) Applicant: Lund, Inc., Buford, GA (US)

(72) Inventors: John Matthew Stanesic, Dacula, GA (US); William Franklin Bibb, VI, Buford, GA (US); Brian T. Johnson, Lawrenceville, GA (US); John A. Wargo, Atlanta, GA (US)

(73) Assignee: Lund, Inc., Buford, GA (US)

( * ) Notice: Subject to any disclaimer, the term of this patent is extended or adjusted under 35 U.S.C. 154(b) by 95 days.

(21) Appl. No.: 14/039,659

(22) Filed: Sep. 27, 2013

(65) Prior Publication Data

US 2015/0091270 A1    Apr. 2, 2015

(51) Int. Cl.
*B60R 3/00* (2006.01)

(52) U.S. Cl.
CPC ...................... *B60R 3/002* (2013.01)

(58) Field of Classification Search
CPC ........................................................ B60R 3/00
USPC .................................................. 280/163–166
See application file for complete search history.

(56) References Cited

U.S. PATENT DOCUMENTS

| | | | |
|---|---|---|---|
| 6,588,783 B2 | 7/2003 | Fichter | |
| 6,874,801 B2 | 4/2005 | Fichter | |
| 7,416,202 B2 | 8/2008 | Fichter | |
| 7,717,444 B2 | 5/2010 | Fichter | |
| 7,731,212 B2 | 6/2010 | Storer | |
| 7,909,344 B1 | 3/2011 | Bundy | |
| 8,382,132 B2 | 2/2013 | Kowalski | |
| 8,448,967 B2 | 5/2013 | Storer | |
| 8,827,293 B1 * | 9/2014 | Bundy | 280/163 |
| 2012/0228848 A1 | 9/2012 | Fichter | |

OTHER PUBLICATIONS

N-FAB Catalog, 2013 Collection, Version 2.1, front page, pp. 24, 25, 28, 29, back page (2013).
Rampage Products Catalog, front page, pp. 21 and back page (2013).

* cited by examiner

*Primary Examiner* — John Walters
*Assistant Examiner* — James Triggs
(74) *Attorney, Agent, or Firm* — Knobbe Martens Olson and Bear LLP

(57) ABSTRACT

A modular side rail and removable step system for a vehicle is disclosed. In one aspect, the kit includes first, second, and third removable steps that may be mounted to the side rail. In one aspect, the side rail main body has a channel-shape defining a longitudinal opening between an adjacent first side and an adjacent second side. A plurality of step attachment arrangements may be provided on the first side of the side rail main body to allow the first, second, and third steps to be mounted to the side rail main body in various configurations. For example the plurality of step attachment arrangements may be arranged and configured to provide attachment locations for mounting the first and third removable steps in a first step assembly configuration and for mounting the second removable step in a second step assembly configuration.

31 Claims, 33 Drawing Sheets

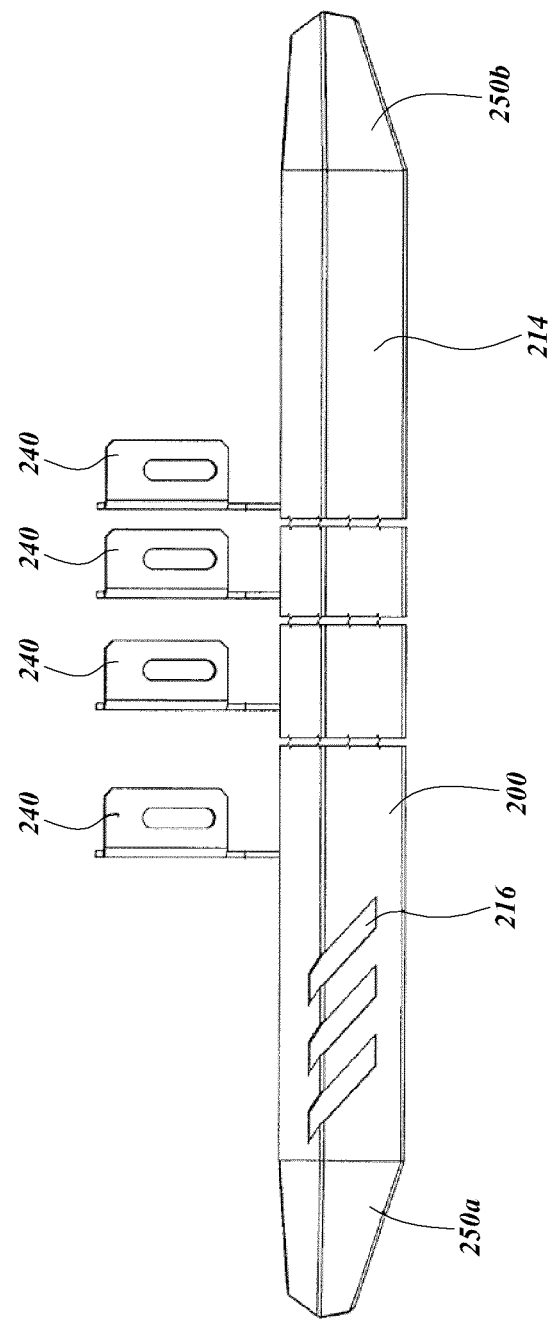

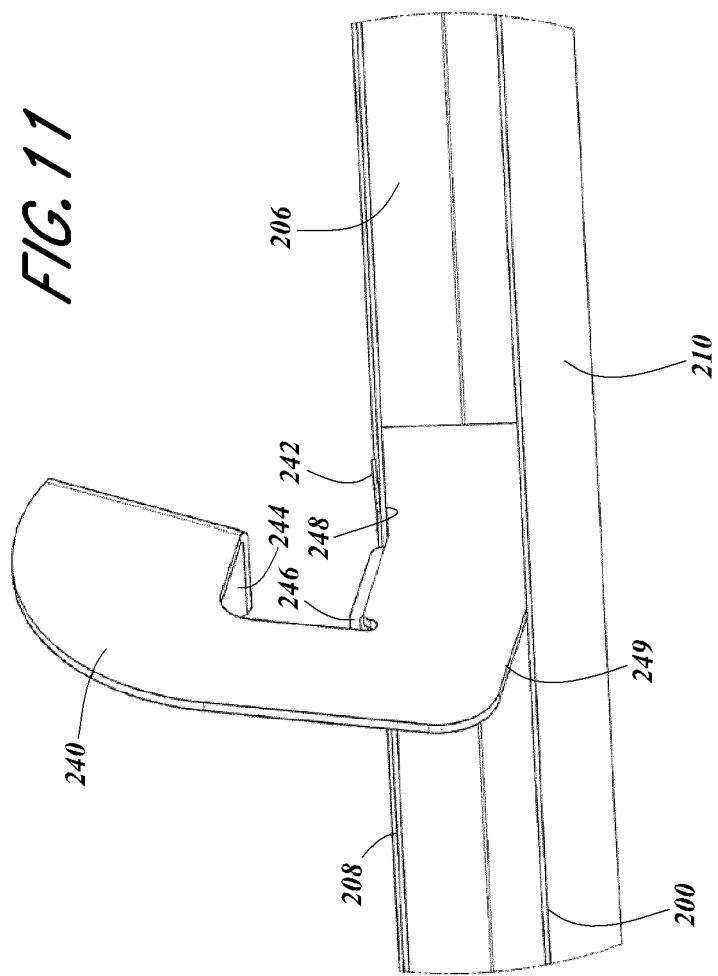

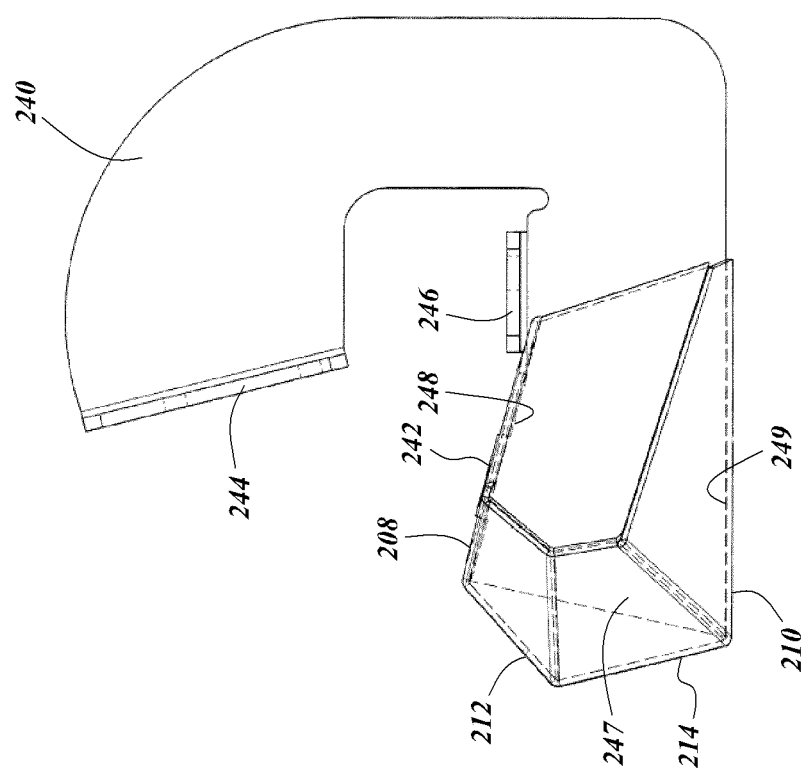

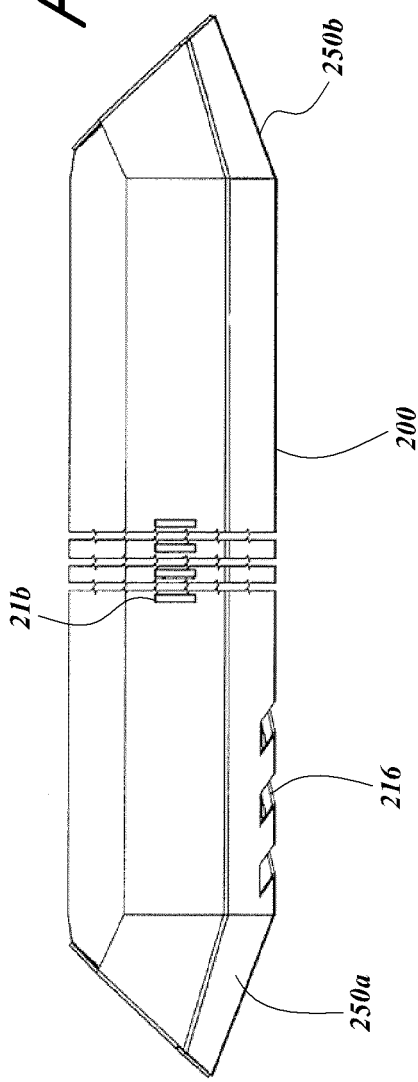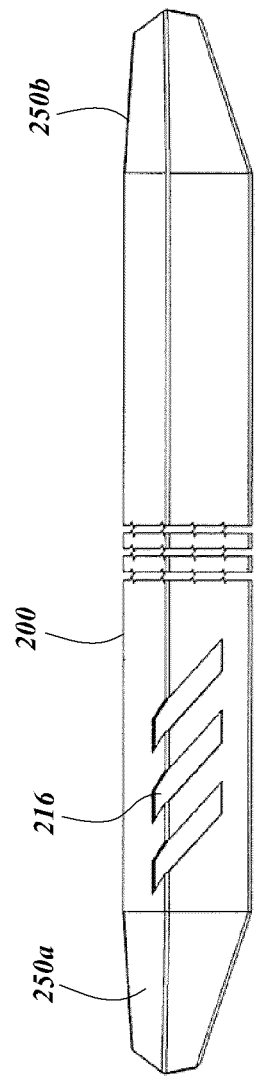

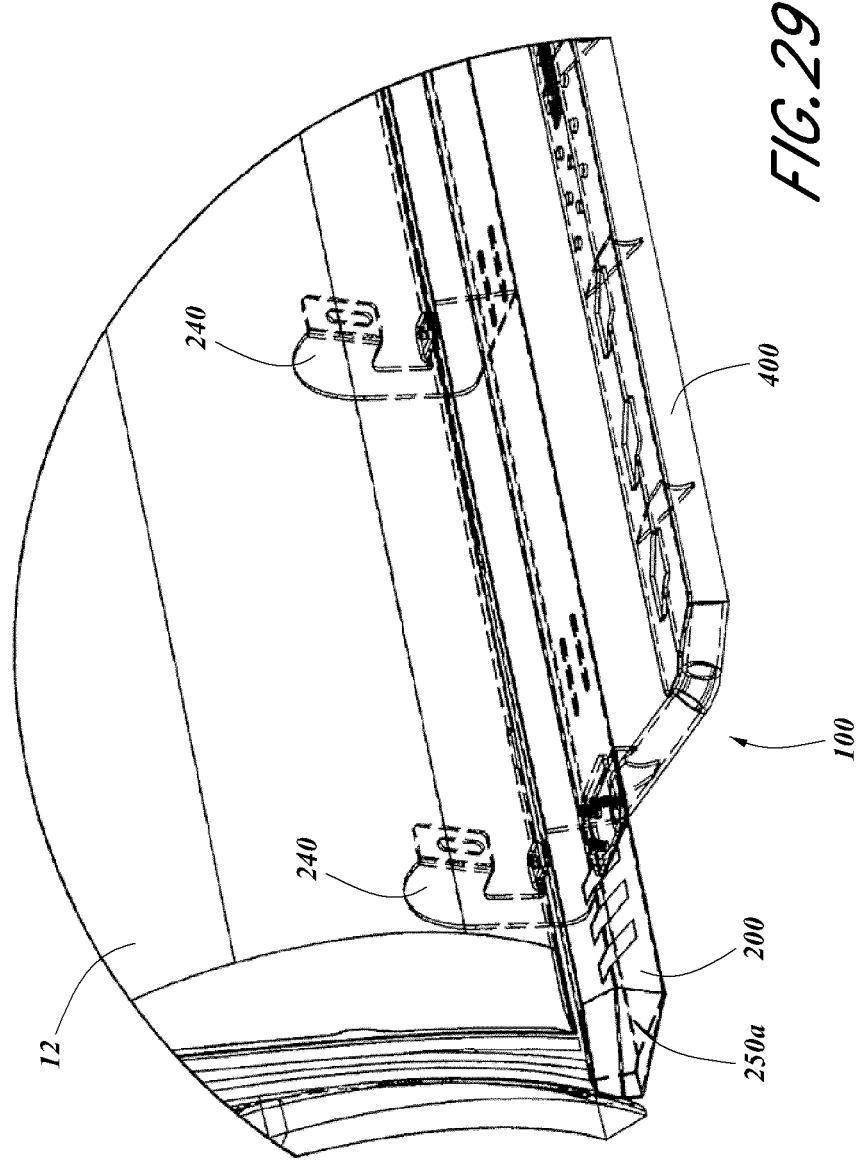

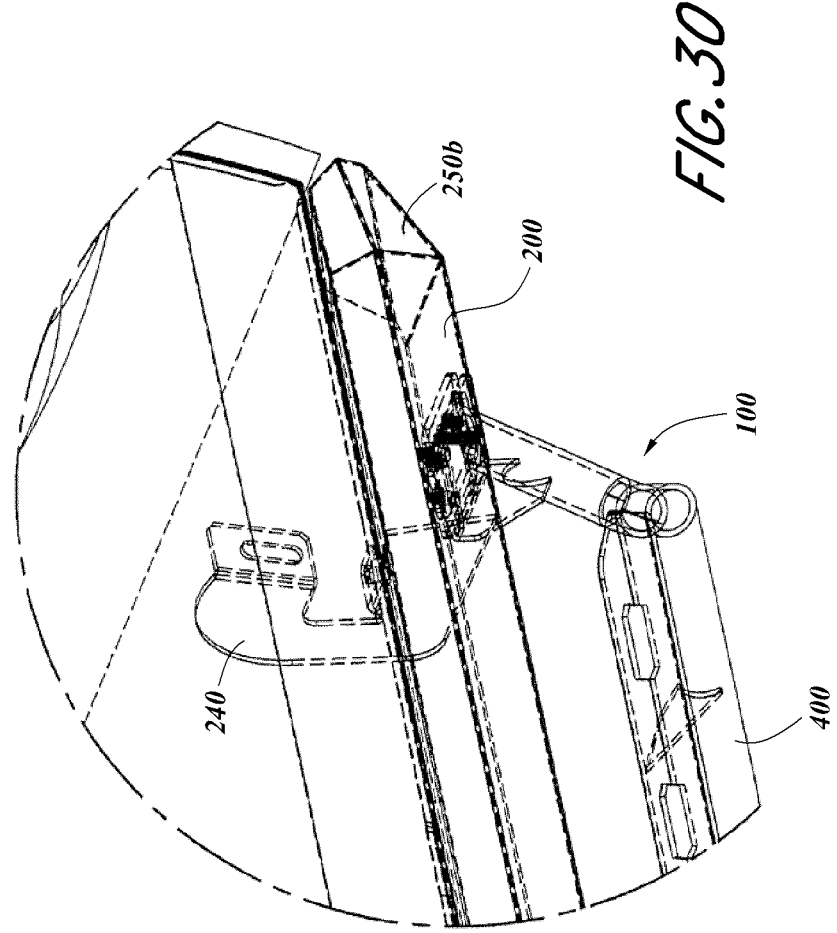

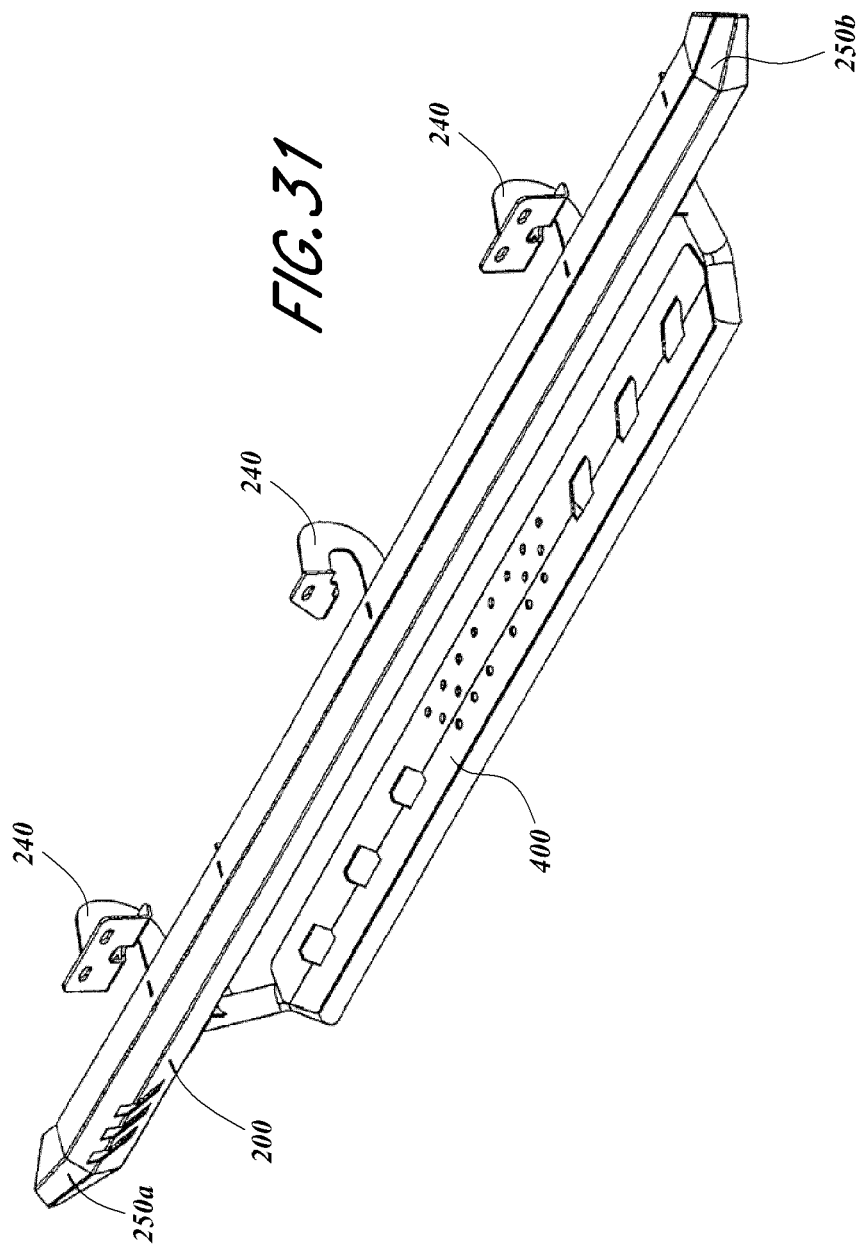

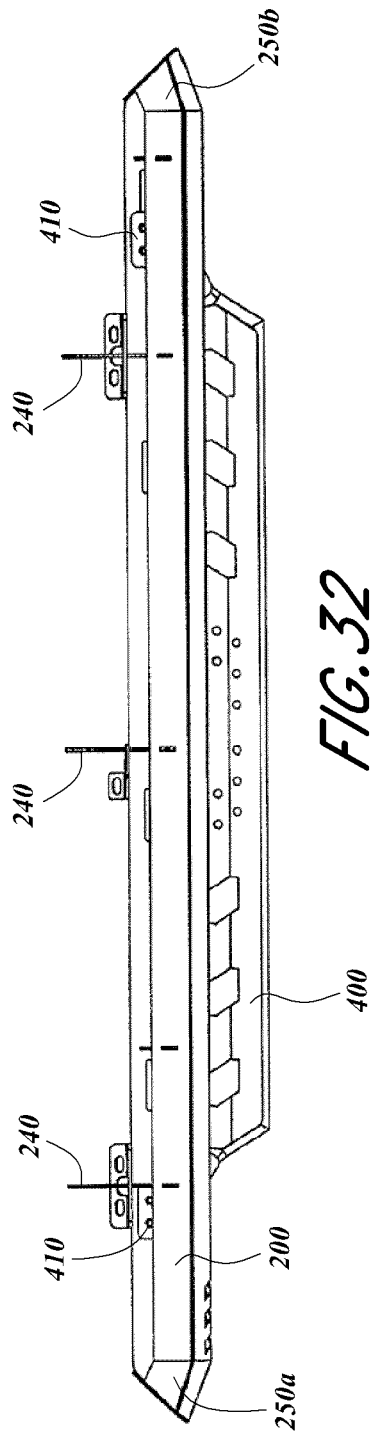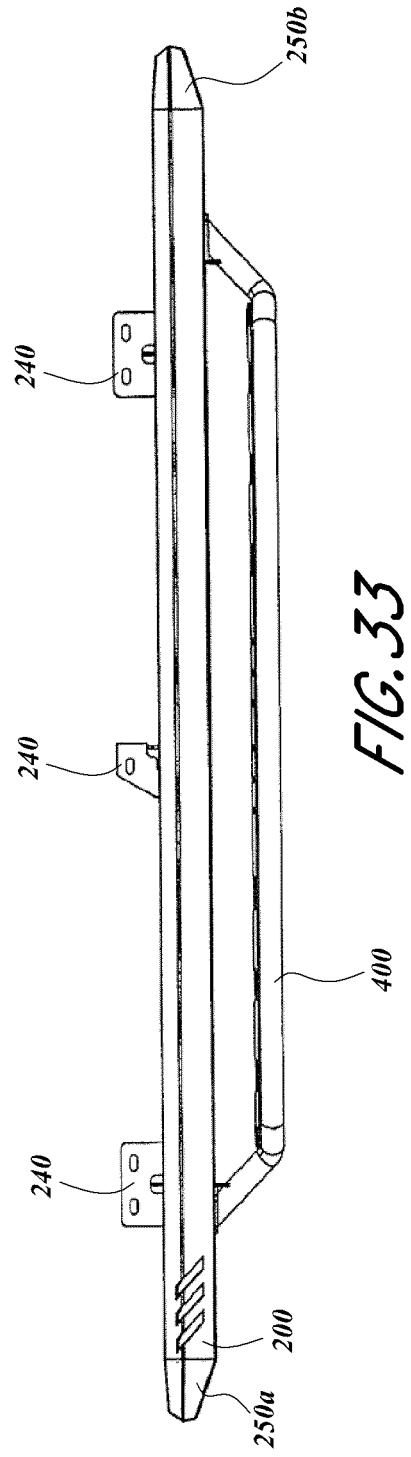

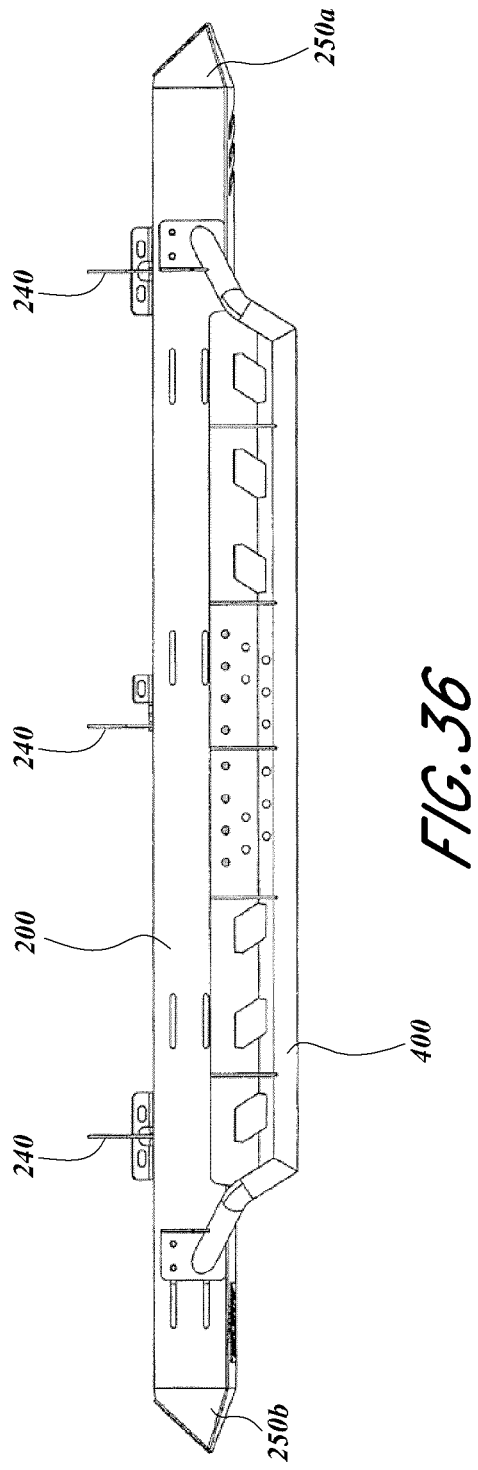

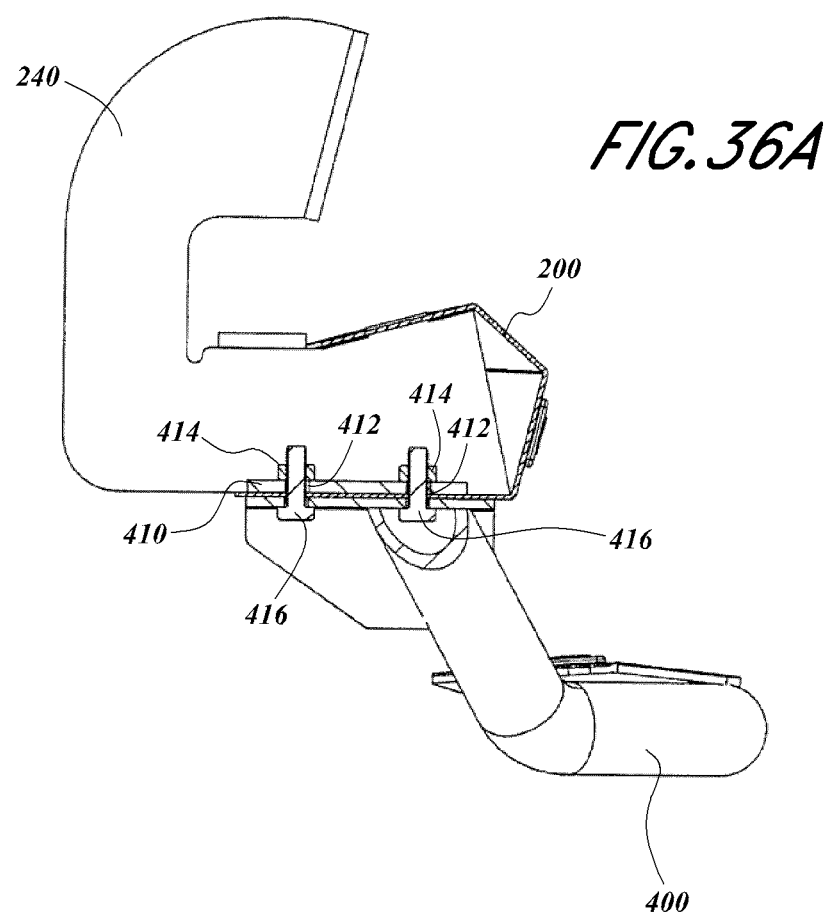

MODULAR RAIL AND STEP SYSTEM

TECHNICAL FIELD

This disclosure relates to a modular side rail and step system for a motor vehicle, a motor vehicle including a modular side rail and step system, and a method for installing a modular side rail to a motor vehicle.

BACKGROUND

Many types of vehicles, including sport utility vehicles (e.g. JEEP® brand vehicles), pickup trucks, and vans, are raised off the ground farther than normal passenger automobiles. The increased height of the floor of the passenger cab from the ground makes it difficult to enter and exit these vehicles. In addition, if the vehicles are driven over rough terrain, their lower body panels and door panels are susceptible to being scratched, dented, or otherwise damaged by rocks or other ground debris. To address these issues, side rails can be mounted to the vehicle to provide a stepping surface to assist the driver and passengers in entering and exiting these vehicles. In addition, side rails can function to protect the body of the vehicles from being damaged from below. As different types and models of vehicles can have different numbers and locations of doors, it is often necessary to manufacture a number of different side rails and steps that will properly fit each specific type of vehicle. Improvements are desired.

SUMMARY

A modular side rail and removable step system for a vehicle is disclosed. In one aspect, the kit includes a first removable step having a first length and a second removable step having a second length greater than the first length. The kit may also include a third removable step having a third length that is about equal to the first length. In another aspect, the kit includes a side rail main body extending between a first end and a second end wherein the side rail main body has a channel-shape defining a longitudinal opening between an adjacent first side rail member and an adjacent second side rail member. A plurality of spaced mounting brackets can also be provided that are configured for mounting the side rail main body to the vehicle. In one embodiment, each of the plurality of mounting brackets extend through the main body longitudinal opening and are secured to the main body, for example by welding. A plurality of step attachment arrangements may also be provided on the second side rail member of the side rail main body that are offset from the locations of the plurality of mounting brackets. The plurality of step attachment arrangements may also be arranged and configured to provide attachment locations for mounting the first and third removable steps in a first step assembly configuration and for mounting the second removable step in a second step assembly configuration. In one embodiment, at least one of the plurality of step attachment arrangements is configured to provide an attachment location for both the first step and the second steps.

The above described modular side rail and removable step system can be installed on a vehicle having a first door by mounting the side rail to the vehicle below the first door via the mounting brackets. The first and/or second removable steps can be mounted to the side rail main body either before or after the side rail is mounted to the vehicle. If a different step configuration is desired, the first and/or second removable steps can be removed from the side rail main body and replaced with a third removable step. It is noted that the steps can installed and removed in any order to change from one configuration to any other desired configuration.

DESCRIPTION OF THE DRAWINGS

Non-limiting and non-exhaustive embodiments are described with reference to the following figures, which are not necessarily drawn to scale, wherein like reference numerals refer to like parts throughout the various views unless otherwise specified.

FIG. 10 is a side view of the modular side rail and brackets of FIG. 9.

FIG. 11 is a perspective rear view of a portion of the modular side rail and brackets of FIG. 9.

FIG. 12 is an end view of the modular side rail and brackets of FIG. 9.

FIG. 13 is a top view of the modular side rail of the system shown in FIG. 1.

FIG. 14 is a side view of the modular side rail of FIG. 13.

FIG. 29 is an enlarged perspective view of a portion of the vehicle provided with the modular side rail and step system in the first step assembly configuration of FIG. 1, as identified at A3 in FIG. 27.

FIG. 30 is an enlarged perspective view of a portion of the vehicle provided with the modular side rail and step system in the second step assembly configuration of FIG. 27, as identified at A4 in FIG. 27.

FIG. 31 is a perspective view of the modular side rail and step system in the second step assembly configuration of FIG. 27.

FIG. 32 is a top view of the modular side rail and step system in the second step assembly configuration of FIG. 27.

FIG. 33 is a side view of the modular side rail and step system in the second step assembly configuration of FIG. 27.

FIG. 36 is a bottom view of the step assembly of the system shown in FIG. 34.

FIG. 36A is a cross-sectional view of the modular side rail and step system in the second step assembly configuration of FIG. 34, taken at a location where a step attaches to the side rail.

DETAILED DESCRIPTION

Figure 1:
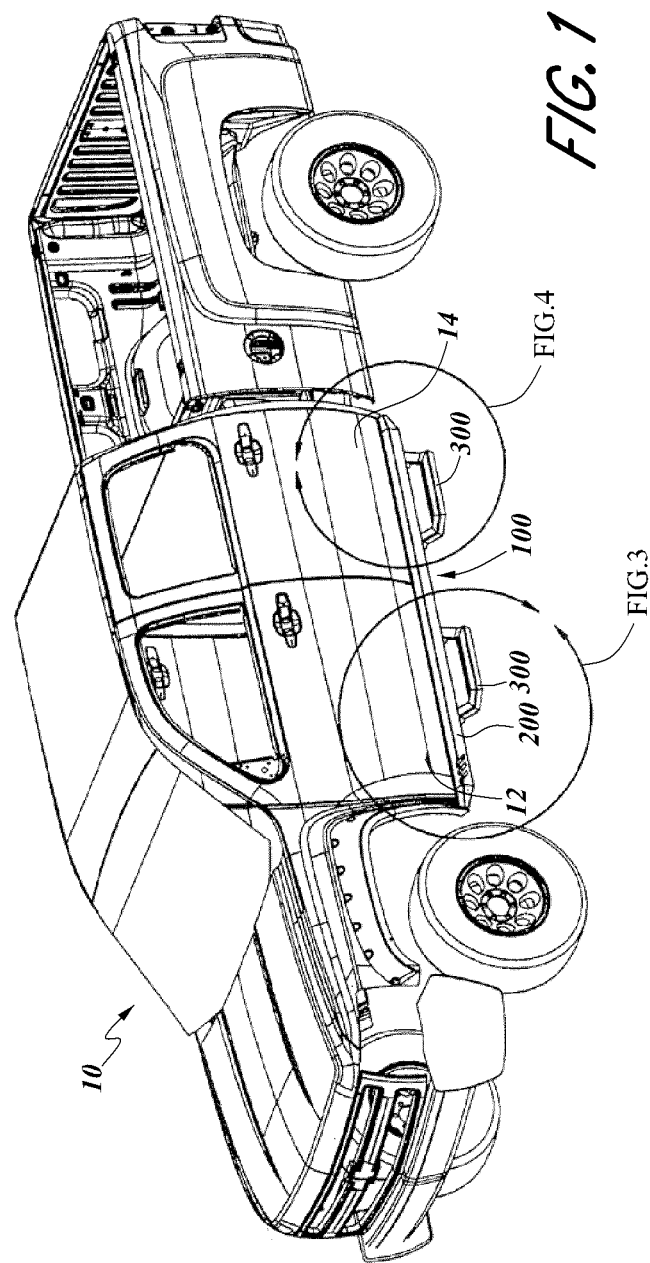
FIG. 1 is a perspective view of a motor vehicle provided with a modular side rail and step system in a first step assembly configuration having features that are examples of aspects in accordance with the principles of the present disclosure.
Figure 2:
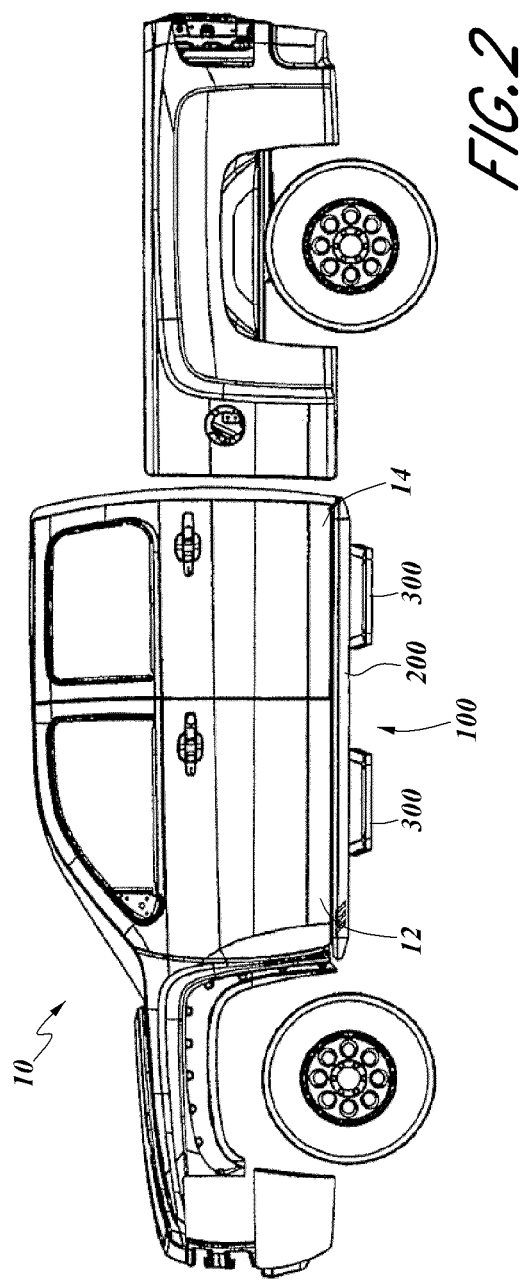
FIG. 2 is a side view of the motor vehicle provided with the modular side rail and step system in the first step assembly configuration of FIG. 1.
Figure 3:
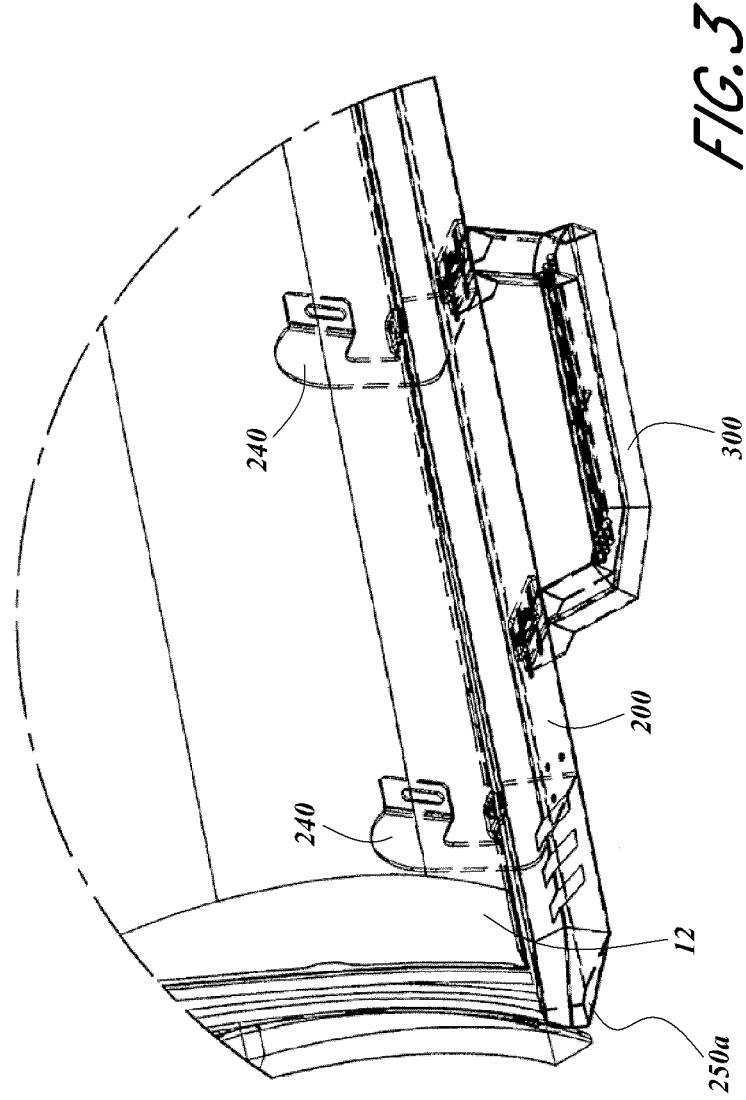
FIG. 3 is an enlarged perspective view of a portion of the vehicle provided with the modular side rail and step system in the first step assembly configuration of FIG. 1, as identified at A1 in FIG. 1.
Figure 4:
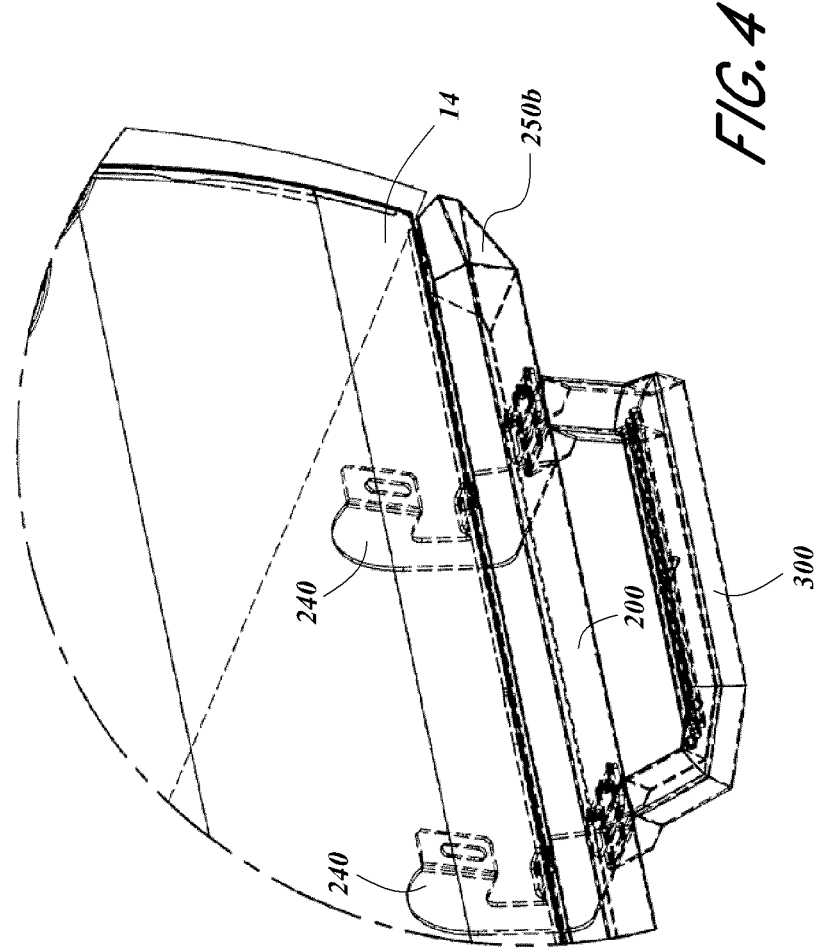
FIG. 4 is an enlarged perspective view of a portion of the vehicle provided with the modular side rail and step system in the first step assembly configuration of FIG. 1, as identified at A2 in FIG. 1.
Figure 5:
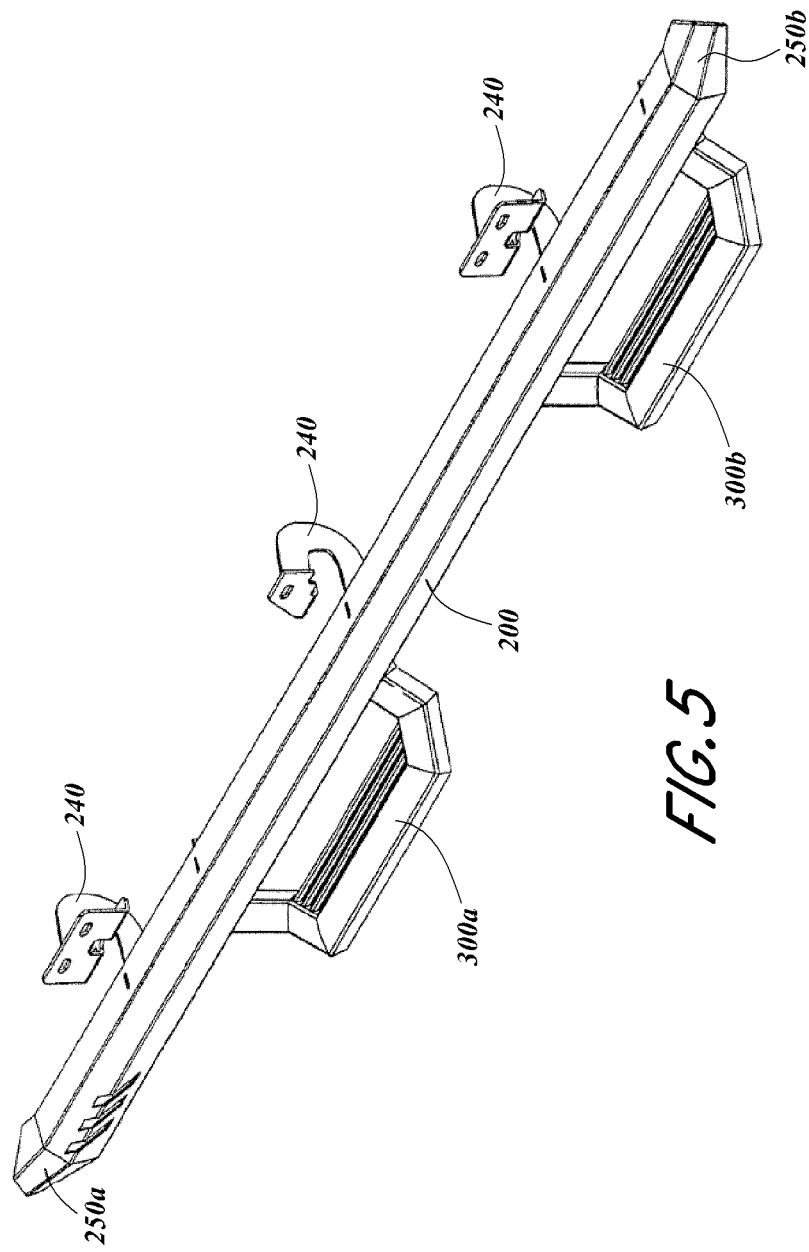
FIG. 5 is a perspective view of the modular side rail and step system in the first step assembly configuration of FIG. 1.
Figure 6:
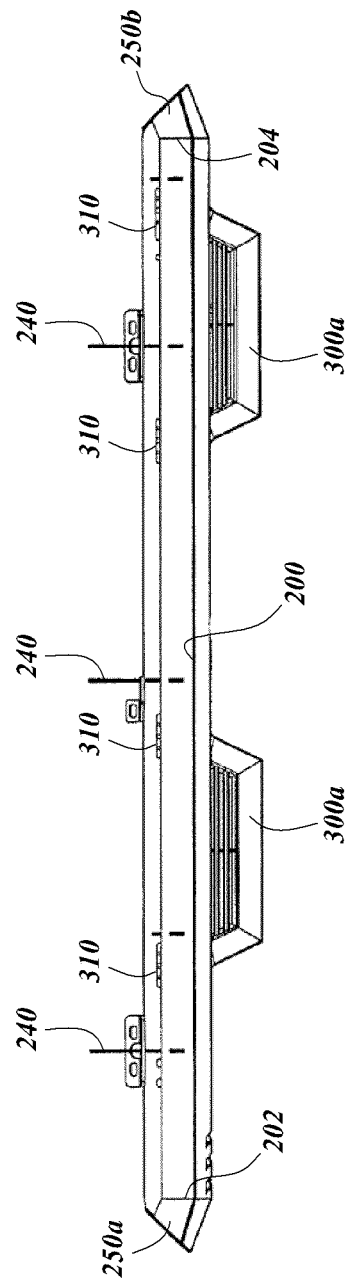
FIG. 6 is a top view of the modular side rail and step system in the first step assembly configuration of FIG. 1.
Figure 7:
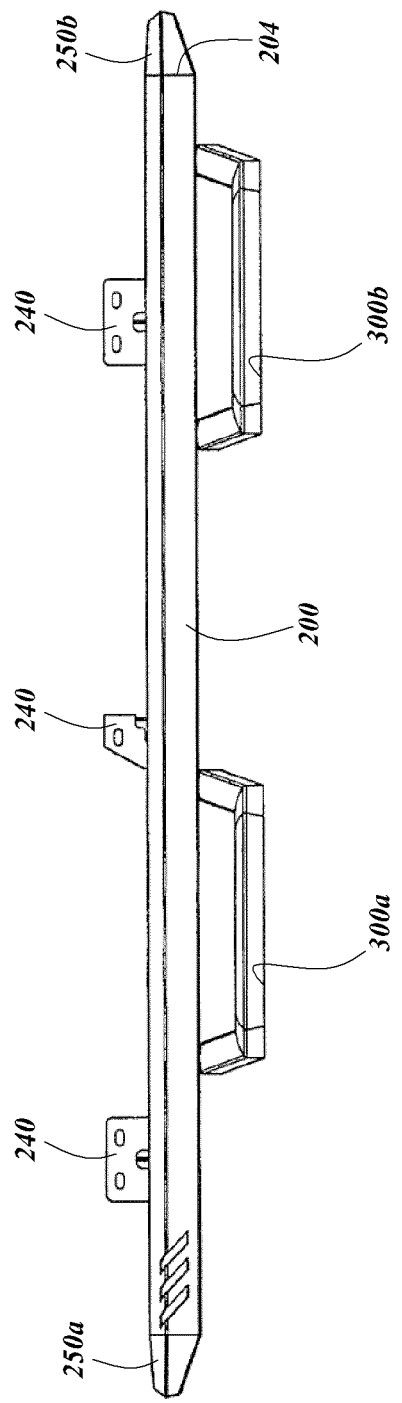
FIG. 7 is a side view of the modular side rail and step system in the first step assembly configuration of FIG. 1.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Figure 27:
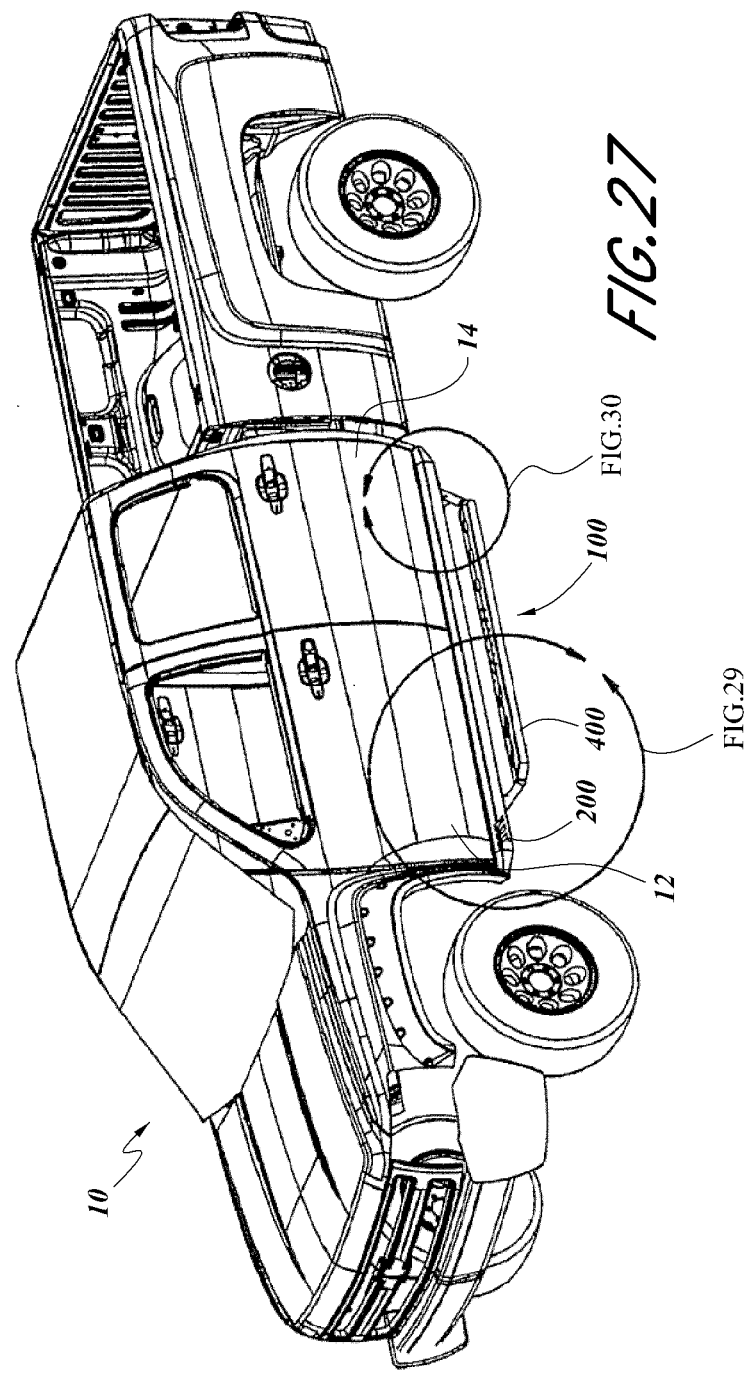
FIG. 27 is a perspective view of the motor vehicle provided with the modular side rail and step system of FIG. 1 in a second step assembly configuration.
Figure 28:
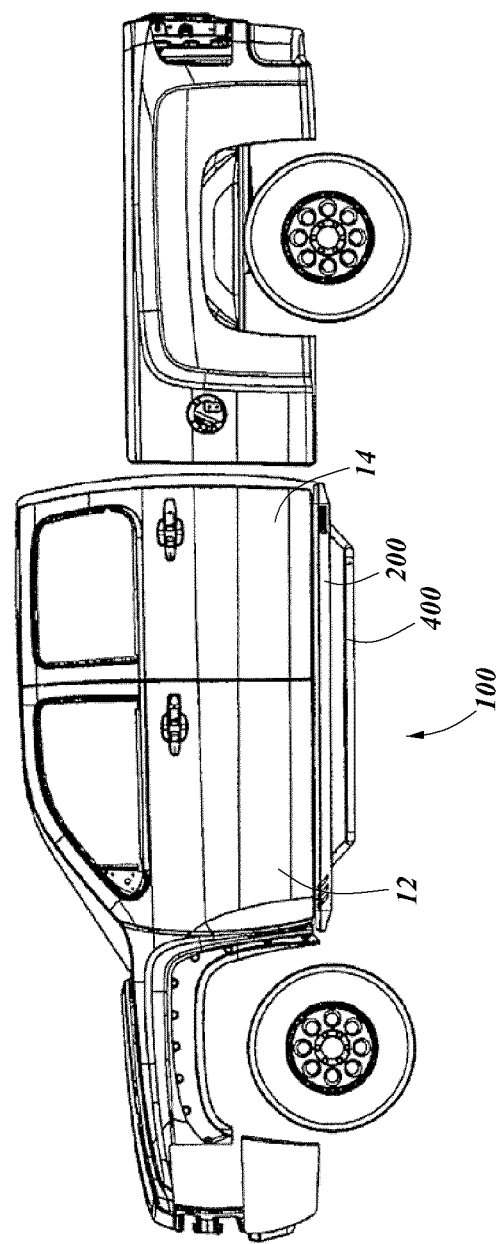
FIG. 28 is a side view of the motor vehicle provided with the modular side rail and step system in the second step assembly configuration of FIG. 27.
Figure 37:
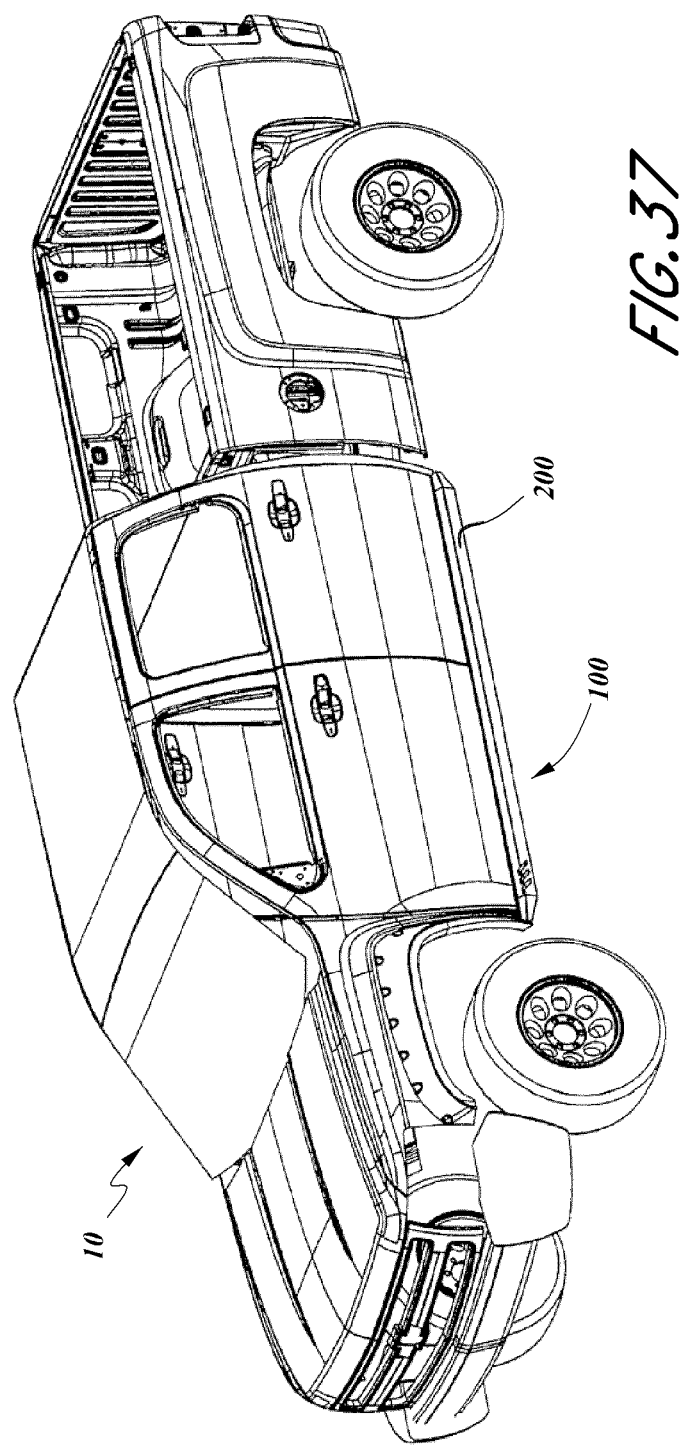
FIG. 37 is a perspective view of the motor vehicle provided with the modular side rail and step system of FIGS. 1 and 27, but without any of the step assemblies installed.

With reference to the Figures, a modular side rail and removable step system 100 for a vehicle 10. As shown, vehicle 10 is a quad-cab pickup truck. However, the system 100 is usable with many other types of vehicles, for example standard cab pickup trucks, extended cab pickup trucks, and sport utility vehicles such as JEEP® brand vehicles. In one aspect, the modular side rail and removable step system 100 includes a side rail main body 200 configured for mounting to vehicle 10 via mounting brackets 240. In turn, the side rail main body 200 is configured to support one or more removable steps (300, 400) that can be placed in a number of different step assembly configurations. For example, FIG. 1 shows two steps 300a, 300b (collectively referenced as 300) mounted to the side rail main body 200 while FIG. 27 shows an alternative arrangement in which a single, longer step 400 is mounted to the same side rail main body 200. Referring to FIG. 37, a configuration is presented in which no steps are mounted on the side rail main body 200, such as may be desired when additional ground clearance is desired. As, the disclosed modular side rail and removable step system 100 can be provided in a multitude of configurations, a portion or all of the same system 100 may be used on a variety of vehicles. Additionally, the modularity of the system 100 allows a vehicle owner to purchase components of the system separately in order to spread out costs. For example, a vehicle owner may initially purchase only the side rail main body 200 and then later purchase the removable steps 300 or 400. Various aspects of the modular side rail and removable step system 100 are discussed further herein.

The side rail main body 200 may also be provided with one or more apertures or slots 216 for aesthetic purposes and/or to allow for improved mud shedding and easier cleaning. As shown, the side rail main body 200 slots 216 extend across the third and fourth side rail members 212, 214 of the side rail main body 200.

Figure 15:
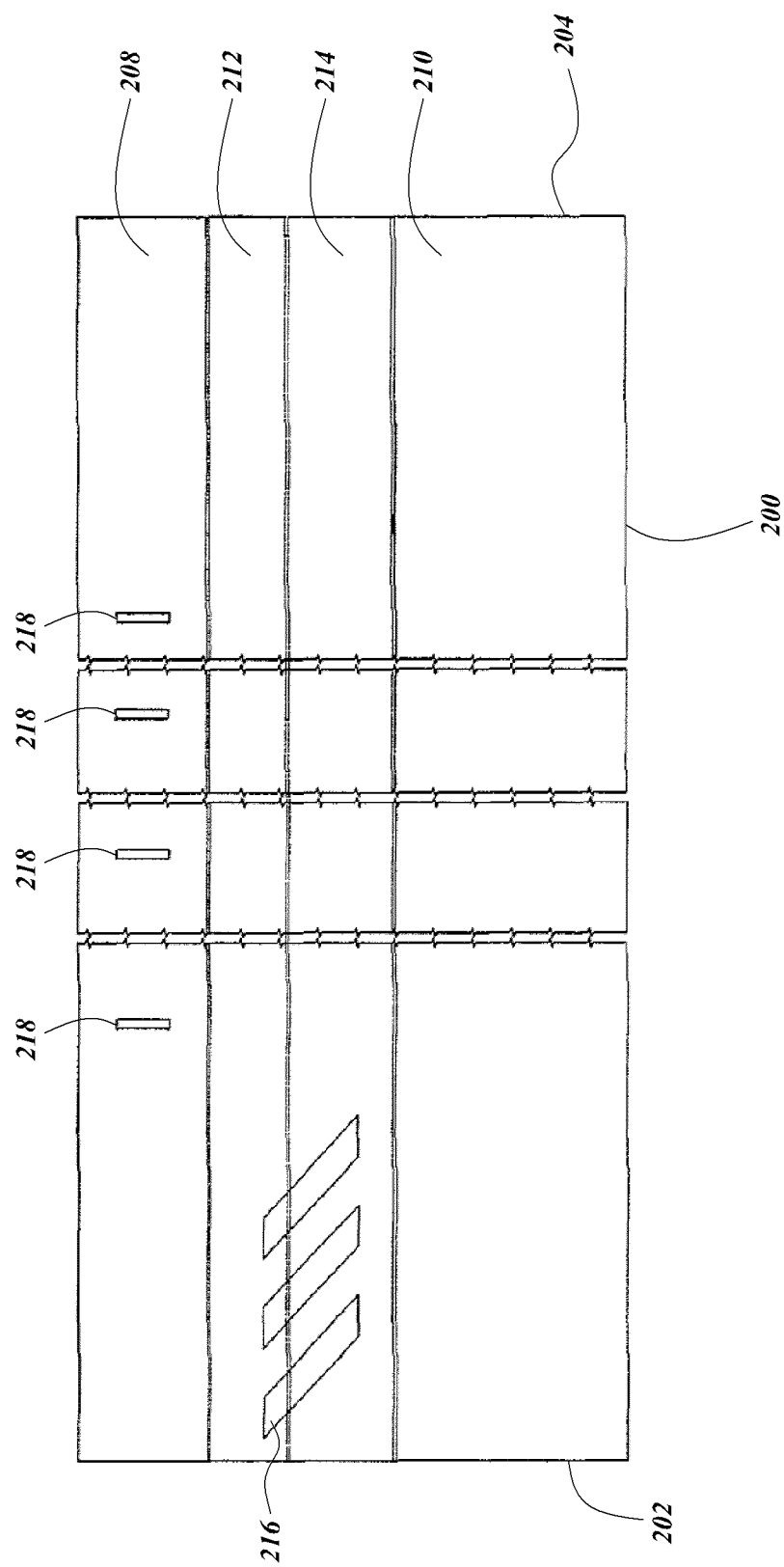
FIG. 15 is a top view of a flat sheet that can be folded to form the modular side rail of FIG. 13.

Referring to FIG. 15, it can be seen that the side rail main body 200 may be formed from an initially flat sheet, for example a flat sheet of about 11 gage steel. Other sheet thicknesses may also be used. The side rail main body 200 may be formed by other processes as well, for example by stamping, casting, or extrusion.

The side rail main body 200 may also be provided with apertures or slots 218 configured to receive a tab portion 242 of the mounting brackets 240. As configured, the tab portion 242 extends through the slot 218 at which point the tab portion 242 can be welded to the side rail main body 200 at the point of the slot 218. Other aspects of the mounting brackets 240 and their connection to the side rail main body 200 are discussed in later paragraphs.

In one aspect, the side rail main body 200 extends between a first end 202 and a second end 204 and is formed to have a channel-shape defining a longitudinal opening 206 extending between the first and second ends 202, 204. As shown, the channel shape of the main body 200 is defined by a first side rail member 208, a second side rail member 210, a third side rail member 212, and a fourth side rail member 214, wherein the first and second side rail members 208, 210 define the longitudinal opening 206. While the side rail main body 200 is shown as having four sides 208, 210, 212, 214, more or fewer sides may be used to form the main body 200, for example two sides, three sides, five sides, and six sides.

In one aspect, the first side rail member 208 of the side rail main body 200 is disposed at an obtuse angle with respect to the adjacent third side rail member 212, the third side rail member 212 is disposed at an obtuse angle with respect to the adjacent fourth side rail member 214, the fourth side rail member 214 is disposed at an obtuse angle with respect to the adjacent second side rail member 210, and the first side rail member 208 is disposed at an acute angle with respect to the opposite second side rail member 210. Additionally, when mounted to the vehicle 10, the second side rail member 210 is generally parallel to the ground. However, it should be understood that other angles may be utilized without departing from the concepts presented herein.

Figure 16:
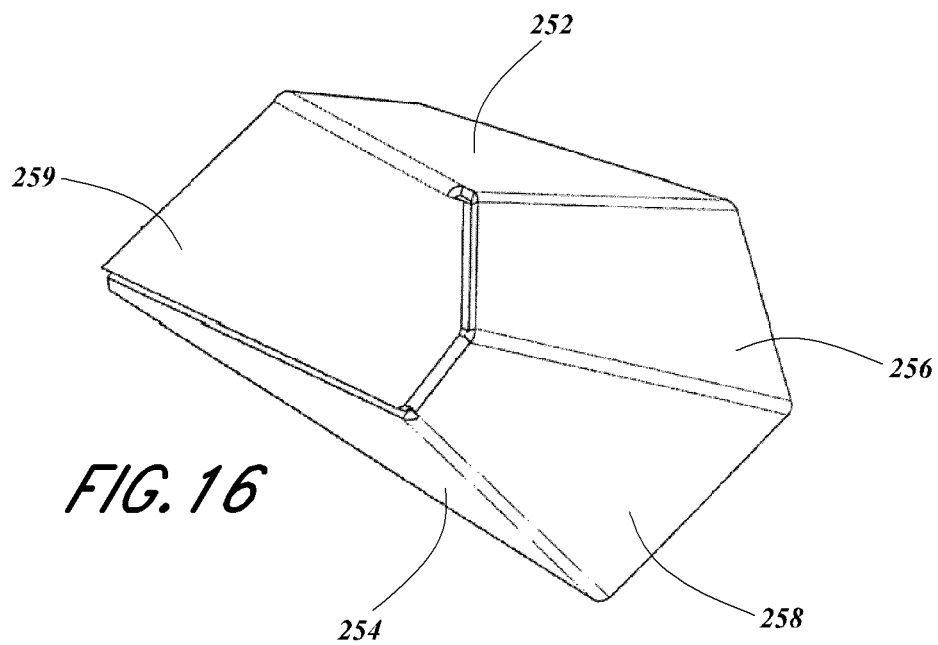
FIG. 16 is a perspective view of an end cap of the modular side rail of FIG. 13.
Figure 17:
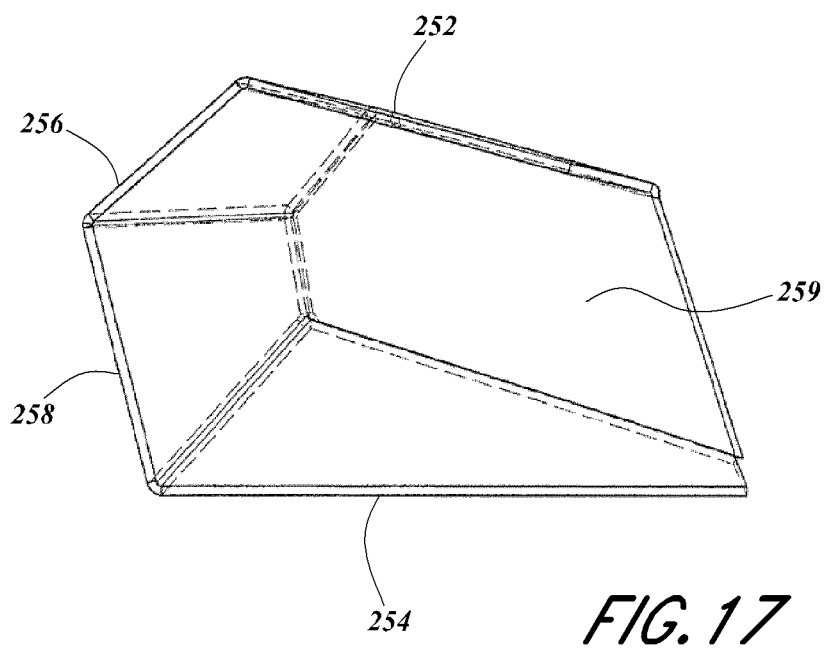
FIG. 17 is an end view of the end cap of FIG. 16.
Figure 18:
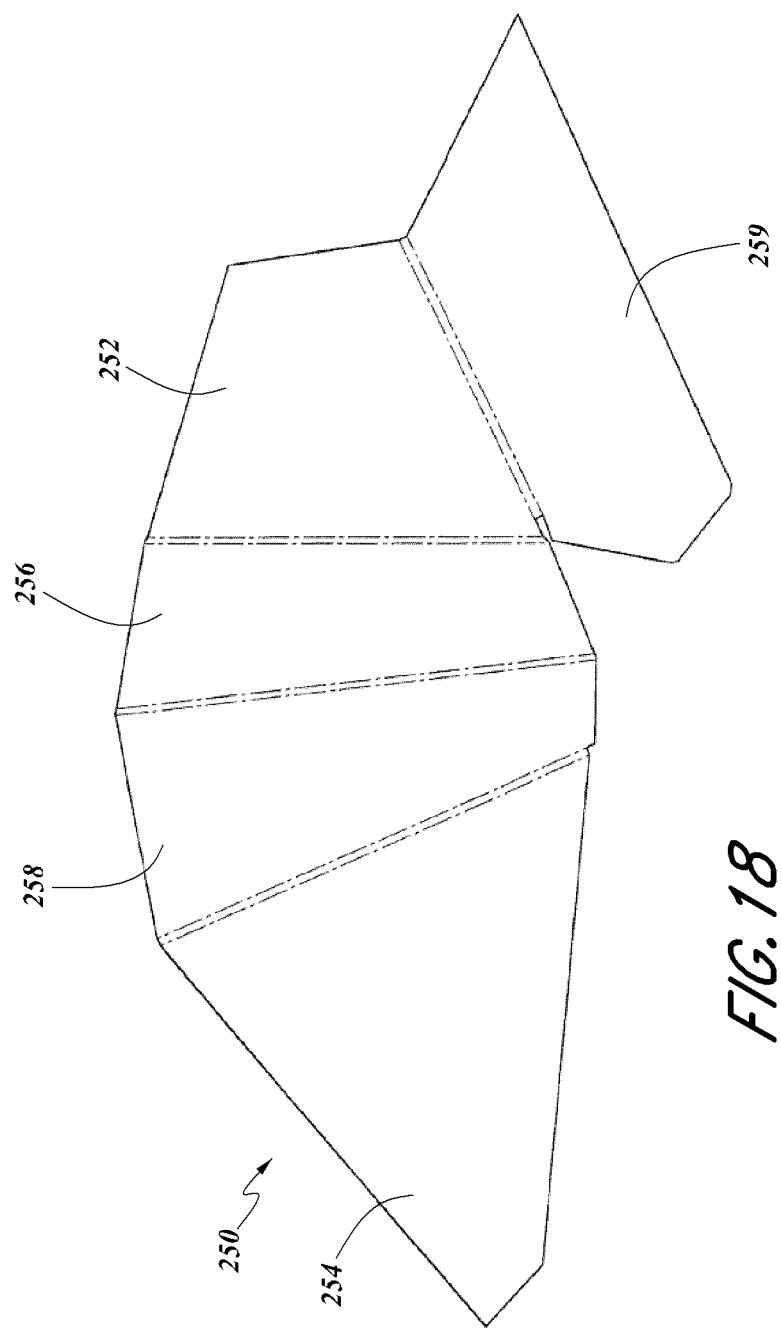
FIG. 18 is a top view of a flat sheet that can be folded to form the end cap of FIG. 16.
Figure 19:
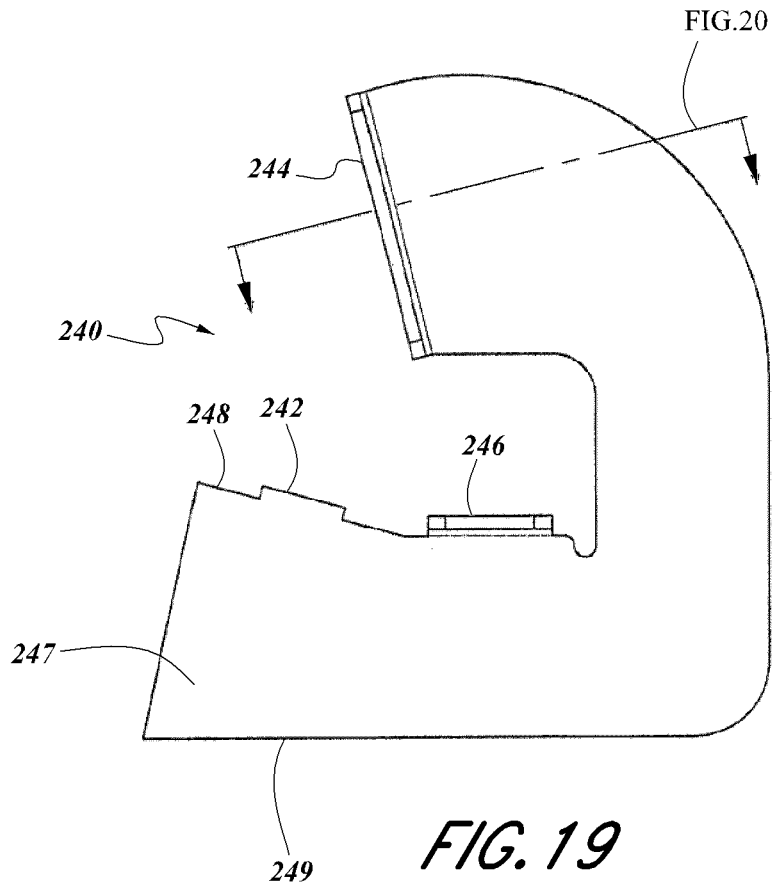
FIG. 19 is a first side view of the bracket of the system shown in FIG. 1.
Figure 20:
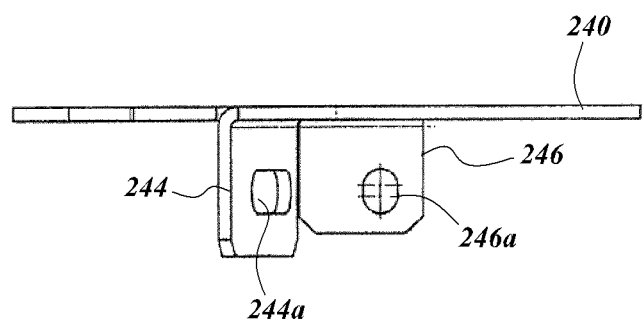
FIG. 20 is a top view of the bracket of the system of FIG. 19.
Figure 21:
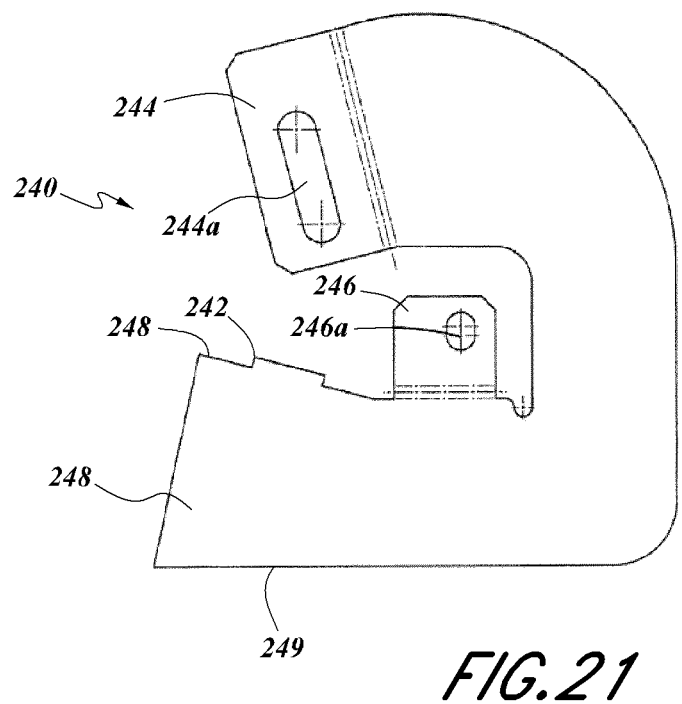
FIG. 21 is a view of a flat sheet that can be folded to form the bracket of the system of FIG. 19.
Figure 22:
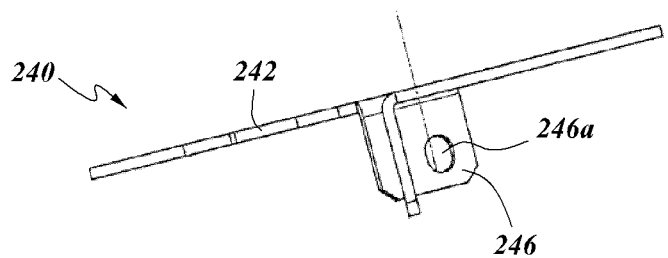
FIG. 22 is a bottom view of the bracket of the system of FIG. 19.
Figure 23:
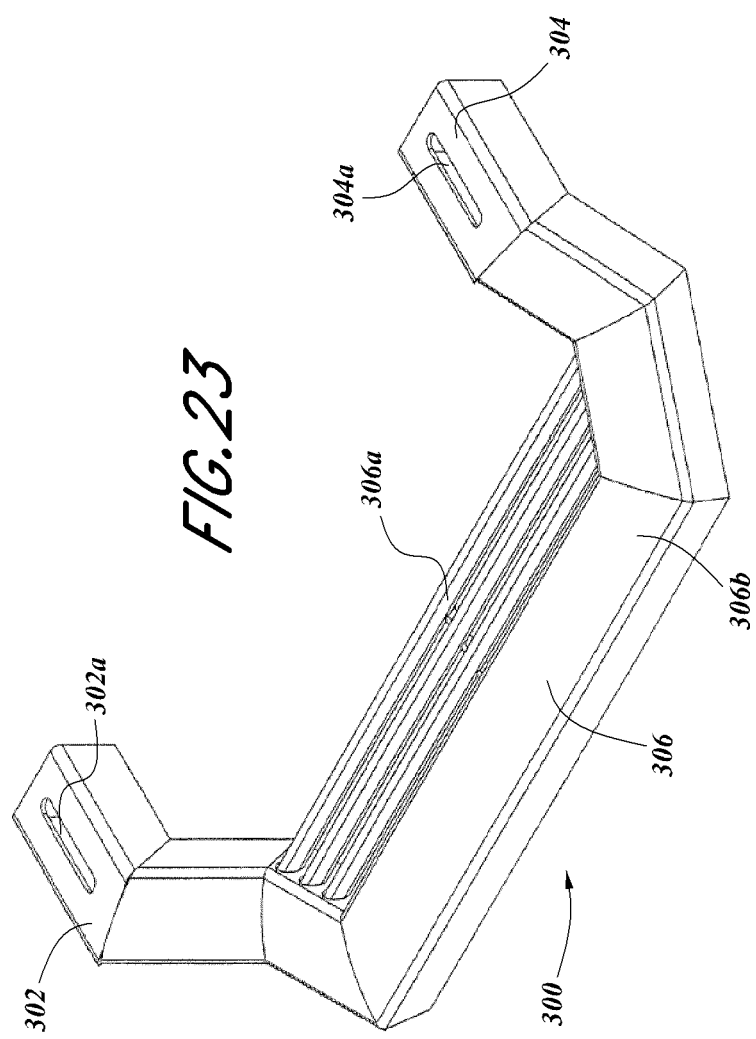
FIG. 23 is a perspective view of one of the step assemblies of the system shown in FIG. 1.
Figure 24:
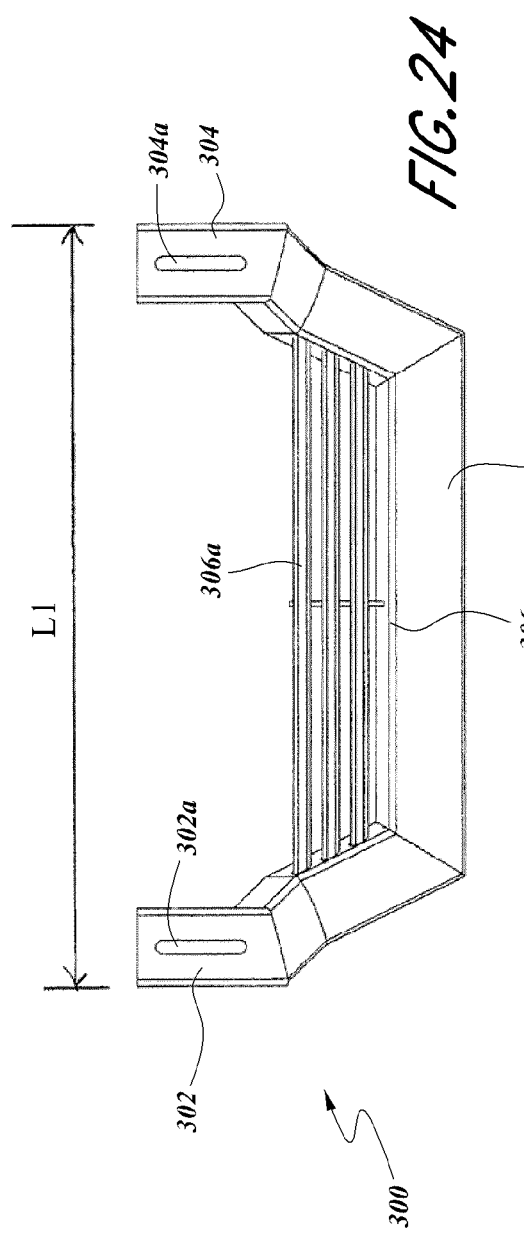
FIG. 24 is a top view of the step assembly of the system shown in FIG. 23.

As shown, the side rail main body 200 may be provided with a first end cap 250a connected to the first end 202 of the side rail main body 200 and a second end cap 250b connected to the second end 204 of the side rail main body 200. in one aspect, the end caps 250a, 250b (collectively referred to as 250) are mirror images of each other and are shaped to match the cross-sectional profile of the side rail main body. With reference to FIGS. 16-18, each end cap 250 is provided with a first side 252, a second side 254, a third side 256, and a fourth side 258 that correspond to the first through fourth side rail members 208, 210, 212, 214 of the side rail main body 200. Each end cap 250 is additionally provided with a fifth side 259 extending between the first through fourth sides 252, 254, 256, 258 to form a closed structure once the end caps 250a, 250b are attached to the side rail main body 200. In the embodiment shown, the end caps 250 are welded to the side rail main body 200. However, other connections means are certainly possible, such as the use of fasteners. Referring to FIG. 18, it can be seen that the end cap 250 may be formed from an initially flat sheet, for example a flat sheet of 11 gage steel. Other sheet thicknesses may also be used.

Figure 8:
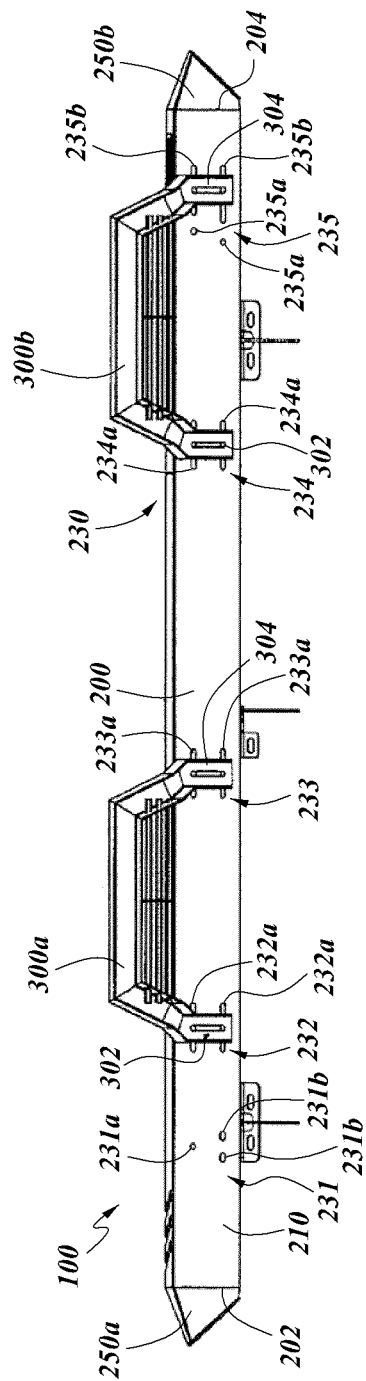
FIG. 8 is a bottom view of the modular side rail and step system in the first step assembly configuration of FIG. 1.

As most easily seen at FIG. 8, the second side rail member 210 of the side rail main body 200 is provided with a plurality of step attachment arrangements 230, for example a first step attachment arrangement 231, a second step attachment arrangement 232, a third step attachment arrangement 233, a fourth step attachment arrangement 234, and a fifth step attachment arrangement 235 (collectively and/or generically referred to as step attachment arrangements 230). The step attachment arrangements 230 are arranged and configured to provide attachment locations for enabling removable steps to be mounted in various assembly configurations. In the exemplary embodiment shown, the plurality of attachment arrangements 230 enable the first and second removable steps 300, 400 to be mounted in the first and second step assembly configurations shown in FIGS. 1 and 27, respectively.

Notably, the locations of the step attachment arrangements 230 are offset from the locations of the slots 218, and thus offset from the mounting brackets 240. This arrangement allows for the side bar main body 200 to be mounted to the vehicle 10 while still allowing for the steps 300, 400 to be mounted in a desired position with respect to the vehicle 10. For example, the mounting locations of the step attachment arrangements 230 allow the steps 300, 400 to be positioned and centered below the doors 12, 14 of the vehicle.

As shown, the step attachment arrangements 230 include a number of differently configured mounting apertures that function as through holes for fasteners (not shown) for securing the steps 300, 400 to the side rail main body 200 in the various step assembly configurations. For example, the first step attachment arrangement 231 is provided with a mounting aperture 231a presented as a circular hole and two mounting apertures 231b presented as short slots. The second, third, and fourth step attachment arrangements 232, 233, 234 are shown as being provided as a pair of mounting apertures 232a, 233a, 234a, respectively, in the form of parallel longitudinally extending slots. The fifth step arrangement 235 is shown as including mounting apertures 235a, 235b presented as circular holes and parallel longitudinally extending slots, respectively. Other numbers and shapes of mounting apertures may be utilized for the step attachment arrangements without departing from the concepts presented herein.

In one aspect, the second and third step attachment arrangements 232, 233 are configured to provide attachment locations for the removable step 300a while the fourth and fifth step attachment arrangements 234, 235 provide attachment locations for the removable step 300b in a first step assembly configuration. In another aspect, the first and fifth step attachment arrangements 231, 235 are configured to provide attachment locations for the removable step 400 in a second step assembly configuration. Many other configurations between steps and/or attachment arrangements to result in additional step assembly configurations are possible without departing from the concepts presented herein.

As identified previously, the side rail main body 200 may be mounted to the vehicle 10 by a plurality of spaced mounting brackets 240. The brackets 240 are shown in greater detail at FIGS. 12 and 19-22. As shown, each mounting bracket 240 includes a first and second mounting arrangement 244, 246 including mounting apertures 244a, 246a, respectively. The mounting arrangements 244, 246 are configured to mate with portions of the vehicle body (not shown) and secure the bracket 240 in both a vertical direction and a horizontal direction with respect to the ground. The mounting apertures 244a, 246a are configured to receive fasteners (not shown) that mount to the vehicle 10 to secure the bracket 240 to the vehicle 10. It is noted that the configuration of the first and second mounting arrangements 244, 246 can be adjusted to match the mounting requirements of a particular vehicle.

Each mounting bracket 240 is further provided with an extension portion 247 having a first side 248 and a second side 249. The previously discussed tab portion 242 extends along the first side 248. In one aspect, the extension portion 247 extends through the longitudinal opening 206 of the side bar main body 200 such that the bracket first side 248 is adjacent to the side bar main body first side rail member 208 and such that the tab portion 242 extends through the slot 218 of the main body 200. Additionally, the bracket second side 249 is adjacent to the side bar main body second side rail member 210. Once assembled, the bracket 240 can be secured to the main body 200 by welding or other means along the first side 248, the second side 249, and/or the tab portion 242 of the bracket 240. Accordingly, the brackets 240 are an integral structural component of the side rail assembly such that the brackets 240 and the side bar main body 200 together form a unitary structure. It is noted that the addition of the brackets 240 to the side bar main body 200 significantly increases the stiffness of the main body 200. Because the second side 249 of each bracket 240 is adjacent to and secured to the side bar main body second side rail member 210, the stiffness at the second side rail member 210 is sufficient to allow the side bar main body 200 to function as a true rock rail to protect the vehicle 10 from impacts from below. This construction also allows for sufficient stiffness to support the weight of a person standing on the step during vehicle entry and exiting. The brackets 240 could also be secured to the main body 200 by means other than welding, for example with fasteners such as rivets or bolts.

Referring to FIGS. 23-26, the removable step 300 is shown in further detail. In one aspect, the removable step 300 has a length L1 defined by a first arm 302 and a second arm 304 between which a step portion 306 is presented. As configured, the first arm 302 is provided with a mounting aperture 302a while the second arm 304 is provided with a mounting aperture 304a. The mounting apertures 302a, 302b are presented as extending slots and are configured to align with the step arrangements 230 of the side bar main body 200. In the embodiment shown, the mounting aperture slots 302a, 302b extend in a direction that is orthogonal to the direction of the slots associated with the second, third, fourth and fifth attachment arrangements 232, 233, 234, 235 which allows for the step to be adjusted in two directions: a direction parallel to the length of the side bar main body 200 and a direction orthogonal to the length of the side bar main body 200.

Figure 8A:
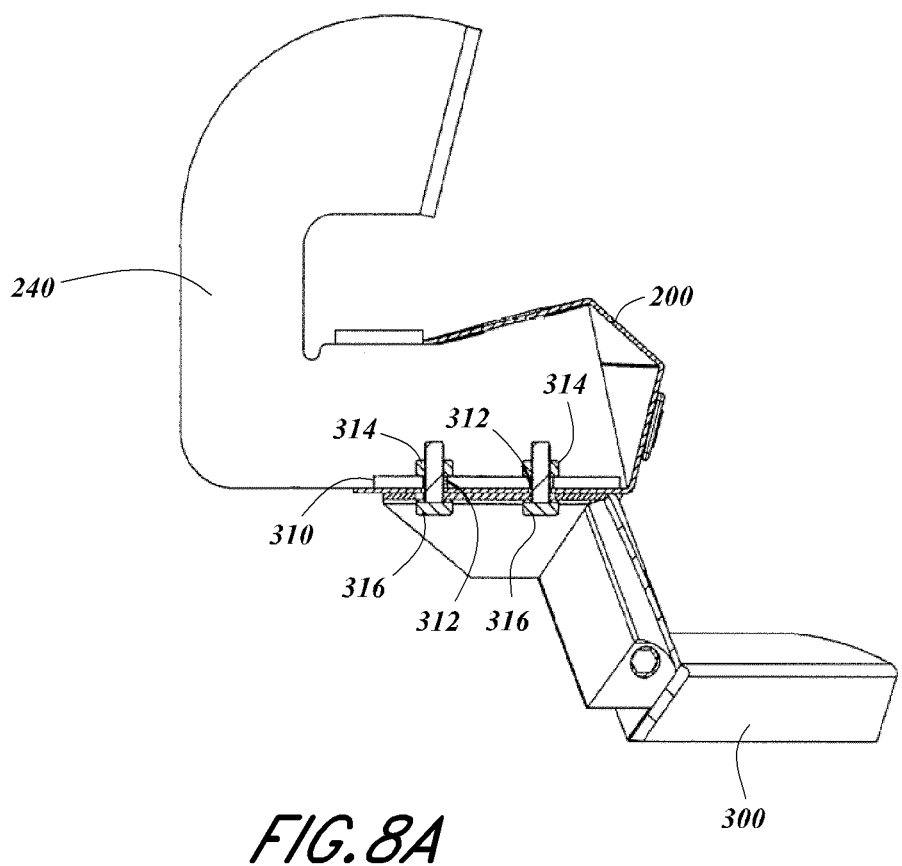
FIG. 8A is a cross-sectional view of the modular side rail and step system in the first step assembly configuration of FIG. 1, taken at a location where a step attaches to the side rail.
Figure 9:
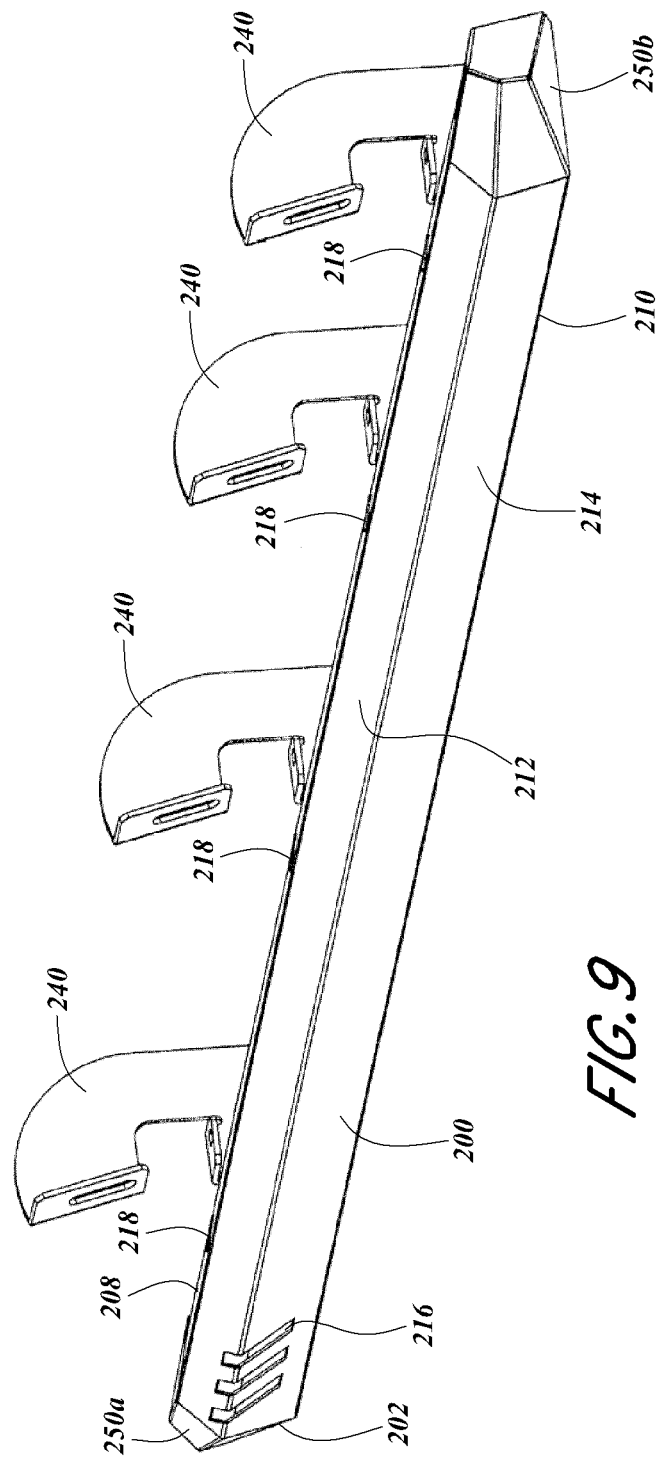
FIG. 9 is a perspective view of the modular side rail and brackets of the system shown in FIG. 1.
Figure 9A:
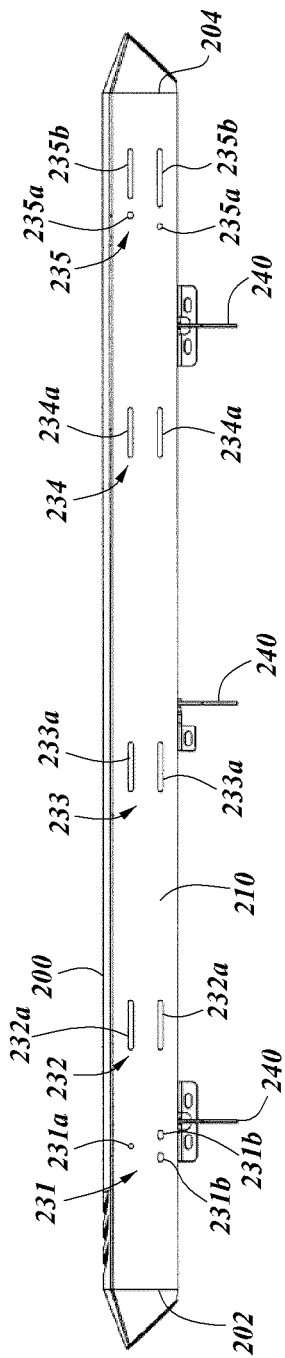
FIG. 9A is a bottom view of the modular side rail and brackets of FIG. 9.

As mentioned previously, the removable step 300 can be removably mounted to the side bar main body 200 via removable fasteners 316, such as bolts. A pinch plate 310 may also be utilized to clamp the second side rail member 210 of the side bar main body 200 on the opposite side of the first and second arms 302, 304 to strengthen the connection between the step 300 and the main body 200, as shown at FIG. 8A. In the embodiment shown, the pinch plate 310 includes apertures 312 that can be aligned with the mounting apertures of the step attachment arrangements such that the fasteners 316 may pass through both the side rail main body 200 and the pinch plate 310. In one aspect, the pinch plate 310 includes a threaded member 314 at each aperture 312, shown herein as a threaded nut welded to the pinch plate, for engaging the fasteners 316.

Figure 25:
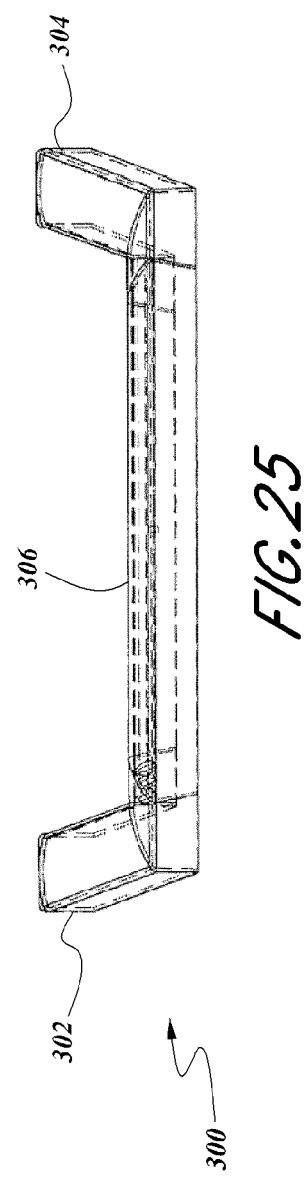
FIG. 25 is a side view of the step assembly of the system shown in FIG. 23.
Figure 25A:
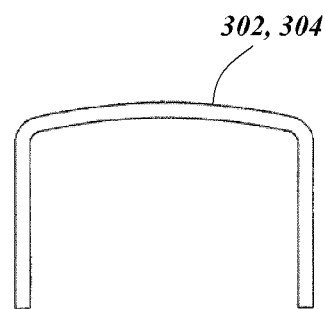
FIG. 25a is a side view of an arm of the step assembly shown in FIG. 23.
Figure 26:
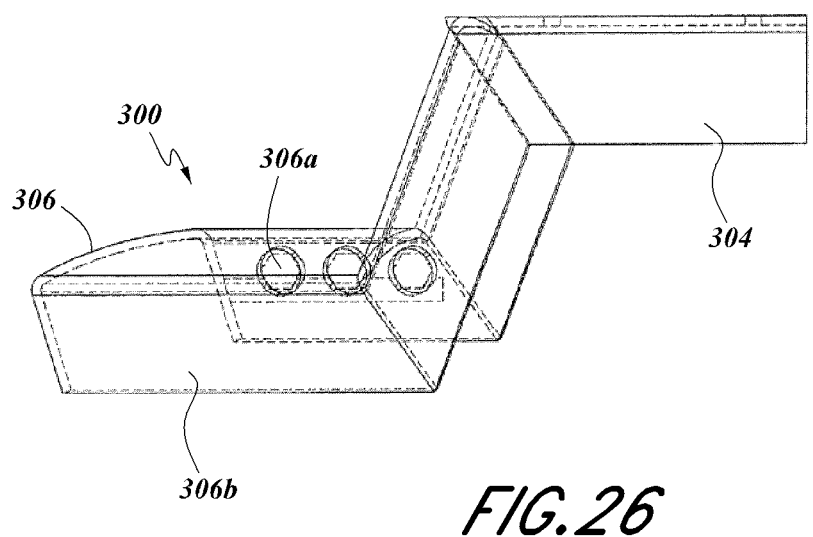
FIG. 26 is an end view of the step assembly of the system shown in FIG. 23.

To further strengthen the step 300, the first and second arms 302, 304 can be provided with a channel-shape, as most easily seen at FIG. 25a. To improve mud shedding and/or aesthetics of the step 300, the step portion 306 may be formed with individually spaced bars 306a extending between a support portion 306b.

Figure 34:
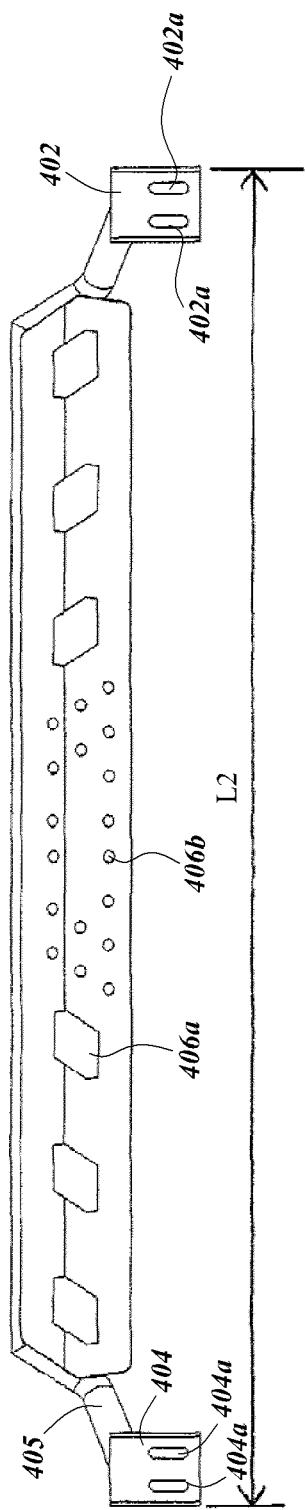
FIG. 34 is a top view of the step assembly of the system shown in FIG. 27.
Figure 35:
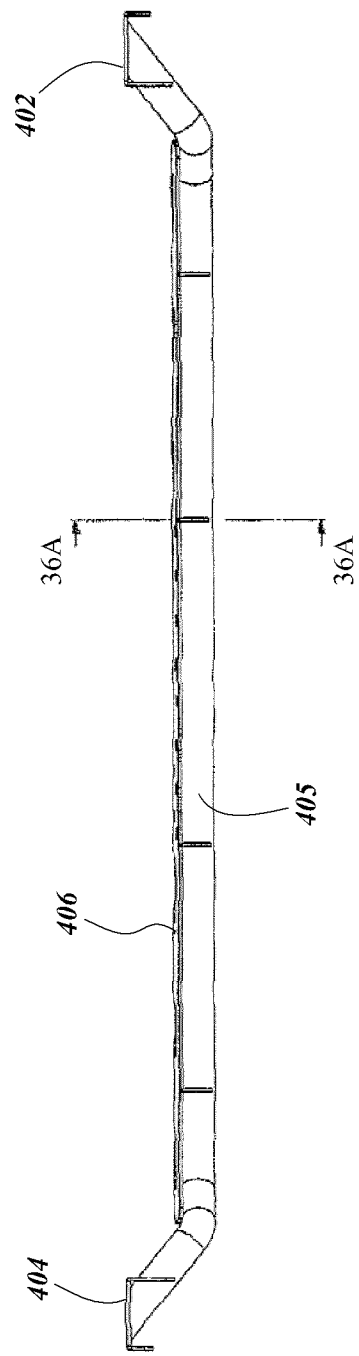
FIG. 35 is a side view of the step assembly of the system shown in FIG. 34.

Referring to FIGS. 34-35, the removable step 400 is shown in further detail. In one aspect, the removable step 400 has a length L2 defined by a first mounting plate 402 and a second mounting plate 404. A support bar 405 is also provided with step 400 that extends between the mounting plates 402, 404 and also serves to support a step portion 406. As presented, the length L1 of the removable step 300 is less than the length L2 of the removable step 400. As configured, the first arm 402 is provided with mounting apertures 402a while the second arm 404 is provided with mounting apertures 404a. The mounting apertures 402a, 402b are presented as parallel extending slots and are configured to align with the step arrangements 230 of the side bar main body 200. In the embodiment shown, the mounting aperture slots 402a, 402b extend in a direction that is orthogonal to the direction of the slots associated with the first and fifth attachment arrangements 231, 235 which allows for the step to be adjusted in two directions: a direction parallel to the length of the side bar main body 200 and a direction orthogonal to the length of the side bar main body 200. However, adjustment in the direction parallel to the length of the side mar main body 200 of the step 400 is limited where mounting apertures 231a and/or 235a are utilized, as is shown in the drawings.

As mentioned previously, the removable step 400 can be removably mounted to the side bar main body 200 via removable fasteners 416, such as bolts. A pinch plate 410 may also be utilized to clamp the second side rail member 210 of the side bar main body 200 on the opposite side of the first and second mounting plates 402, 404 to strengthen the connection between the step 400 and the main body 200, as shown at FIG. 36A. In the embodiment shown, the pinch plate 410 includes apertures 412 that can be aligned with the mounting apertures of the step attachment arrangements such that the fasteners 416 may pass through both the side rail main body 200 and the pinch plate 410. In one aspect, the pinch plate 410 includes a threaded member 414 at each aperture 412, shown herein as a threaded nut welded to the pinch plate, for engaging the fasteners 416.

To improve mud shedding and/or aesthetics of the step 400, the step portion 406 may be formed with various openings 406a, 406b. As shown, the step portion 406 is welded to the support arm 405. To further strengthen the step 400, the first and second mounting plates 402, 404 can be provided with a channel-shape, as most easily seen at FIG. 35. To improve mud shedding and/or aesthetics of the step 300, the step portion 306 may be formed with individually spaced bars 306a extending between a support portion 306b.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the disclosure.

What is claimed is:

1. A modular side rail for a vehicle comprising:
 a. a side rail main body having a first side rail member and a second side rail member extending between a first end and a second end, the side rail main body having a longitudinal opening defined between the first and second side rail members;
 b. a plurality of mounting brackets configured for mounting the side rail main body to the vehicle, each of the plurality of mounting brackets being constructed to extend into the longitudinal opening of the side rail main body and to be secured to the main body; and
 c. a plurality of step attachment arrangements provided on the second side rail member, the plurality of step attachment arrangements being constructed to receive fasteners located along the second side rail member and to provide attachment locations for one or more removable steps, wherein at least some of the plurality of step attachment arrangements are configured as a pair of parallel slots extending in a direction parallel to the longitudinal opening.

2. The modular side rail of claim 1, wherein the plurality of step attachment arrangements are configured to provide attachment locations for a first removable step having a first length and a second removable step having a second length greater than the first length.

3. The modular side rail of claim 2, wherein at least one of the plurality of step attachment arrangements is configured to provide an attachment location for both the first step and the second step.

4. The modular side rail of claim 1, wherein the plurality of step attachment arrangements includes first, second, third, fourth, and fifth step attachment arrangements, the first step attachment arrangement being nearest the first end of the side rail main body, the fifth step attachment arrangement being nearest the second end of the side rail main body, the second, third, and fourth step attachment arrangements being between the first and fifth step attachment arrangements.

5. The modular side rail of claim 4, wherein the first, second, third, fourth and fifth step attachment arrangements are configured to provide for at least a first step assembly configuration and an alternative second step assembly configuration:
 a. the first step assembly configuration including the second and third step attachment arrangements providing attachment locations for a first removable step having a first length and the fourth and fifth step attachment arrangements providing attachment locations for a second removable step having a second length equal to the first length;
 b. the second step assembly configuration including the first and fifth step attachment arrangements providing attachment locations for a third removable step having a third length greater than each of the first length and the second length.

6. The modular side rail of claim 1, further comprising:
 a. a first end cap attached to the side rail main body first end; and
 b. a second end cap attached to the side rail main body second end.

7. The modular side rail of claim 1, wherein the side rail main body is folded from an initially flat metal sheet.

8. The modular side rail of claim 1, wherein the side rail main body further includes a third side rail member adjacent the first side rail member and a fourth side rail member adjacent the second and third side rail members.

9. The modular side rail of claim 8, wherein the first side rail member is disposed at an obtuse angle with respect to the adjacent third side rail member, wherein the third side rail member is disposed at an obtuse angle with respect to the adjacent fourth side rail member, and wherein the fourth side rail member is disposed at an obtuse angle with respect to the adjacent second side rail member.

10. The modular side rail of claim 1, wherein the plurality of mounting brackets are spaced along and secured to the side rail main body.

11. The modular side rail of claim 10, wherein each of the plurality of mounting brackets are secured to the side rail main body by welding.

12. The modular side rail of claim 10, wherein each of the plurality of mounting brackets is welded to the first side rail member and welded to the second side rail member.

13. The modular side rail of claim 1, further comprising a pinch plate constructed to receive and engage with the one or more fasteners.

14. A modular side rail and removable step system for a vehicle comprising:
 a. a first removable step having a first length;
 b. a second removable step having a second length greater than the first length;
 c. a side rail main body having a first side rail member and a second side rail member extending between a first end and a second end, the side rail main body having a longitudinal opening defined between the first and second side rail members;
 d. a plurality of mounting brackets configured for mounting the side rail main body to the vehicle, each of the plurality of mounting brackets being constructed to extend into the longitudinal opening of the side rail main body and to be secured to the main body; and
 e. a plurality of step attachment arrangements provided on the second side rail member, the plurality of step attachment arrangements being constructed to receive fasteners located along the second side rail member and to provide attachment locations for mounting the first removable step in a first step assembly configuration and for mounting the second removable step in a second step assembly configuration.

15. The modular side rail and removable step system of claim 14, wherein at least one of the plurality of step attachment arrangements is configured to provide an attachment location for both the first step and the second step.

16. The modular side rail and removable step system of claim 14, wherein at least some of the plurality of step attachment arrangements are configured as a pair of parallel slots extending in a direction parallel to the longitudinal opening.

17. The modular side rail and removable step system of claim 14, further including a third step having a third length, wherein the plurality of step attachment arrangements are further arranged and configured to provide attachment locations for mounting the third removable step in the first step assembly configuration.

18. The modular side rail and removable step system of claim 17, wherein the third length is equal to the first length.

19. The modular side rail and removable step system of claim 17, wherein the plurality of step attachment arrangements includes first, second, third, fourth, and fifth step attachment arrangements, the first step attachment arrangement being nearest the first end of the side rail main body, the fifth step attachment arrangement being nearest the second end of the side rail main body, the second, third, and fourth step attachment arrangements being between the first and fifth step attachment arrangements.

20. The modular side rail and removable step system of claim 19, wherein:
 a. the first step assembly configuration includes the second and third step attachment arrangements providing attachment locations for the first removable step and the fourth and fifth step attachment arrangements providing attachment locations for the third removable step;
 b. the second step assembly configuration including the first and fifth step attachment arrangements providing attachment locations for the second removable step.

21. The modular side rail and removable step system of claim 14, further comprising:
 a. a first end cap attached to the side rail main body first end; and
 b. a second end cap attached to the side rail main body second end.

22. The modular side rail and removable step system of claim 14, wherein the side rail main body is folded from an initially flat metal sheet.

23. The modular side rail and removable step system of claim 14, wherein the side rail main body further includes a third side adjacent the first side rail member and a fourth side rail member adjacent the second and third side rail members.

24. The modular side rail and removable step system of claim 23, wherein the first side rail member is disposed at an obtuse angle with respect to the adjacent third side rail member, wherein the third side rail member is disposed at an obtuse angle with respect to the adjacent fourth side rail member, and wherein the fourth side rail member is disposed at an obtuse angle with respect to the adjacent second side rail member.

25. A vehicle and step system comprising:
 a. a vehicle having at least a first door;
 b. a modular side rail and removable step system for a vehicle comprising:
  i. a first removable step having a first length;
  ii. a second removable step having a second length greater than the first length;
  iii. a side rail main body having a first side rail member and a second side rail member extending between a first end and a second end, the side rail main body having a longitudinal opening defined between the first and second side rail members;
  iv. a plurality of mounting brackets securing the side rail main body to the vehicle beneath the first door, each of the plurality of mounting brackets extending into the longitudinal opening of the side rail main body and being secured to the side rail main body; and
  v. a plurality of step attachment arrangements provided on the second side rail member, the plurality of step attachment arrangements being constructed to receive fasteners located along the second side rail member and to provide attachment locations for mounting the first removable step in a first step assembly configuration and for mounting the second removable step in a second step assembly configuration.

26. A method for installing a modular side rail and removable step system onto a vehicle comprising the steps of:
 a. providing a vehicle having at least a first door;
 b. providing a modular side rail including:
  i. a side rail main body having a first side rail member and a second side rail member extending between a first end and a second end, the side rail main body having a longitudinal opening defined between the first and second side rail members;

ii. a plurality of mounting brackets constructed to secure the side rail main body to the vehicle, each of the plurality of mounting brackets extending into the longitudinal opening of the side rail main body and being secured to the side rail main body; and
iii. a plurality of step attachment arrangements provided on the second side rail member, the plurality of step attachment arrangements being constructed to receive fasteners located along the second side rail member and to provide attachment locations for mounting the first removable step in a first step assembly configuration and for mounting the second removable step in a second step assembly configuration;
c. mounting the side rail to the vehicle below the first door; and
d. attaching at least the first removable step to the side rail main body.

27. The method for installing a modular side rail and removable step system onto a vehicle of claim 26, further including the step of:
a. removing the first removable step from the side rail main body and installing the second removable step onto the side rail main body.

28. A modular side rail for a vehicle comprising:
a. a side rail main body having a first side rail member and a. second side rail member extending between a first end and a second end, the side rail main body having a longitudinal opening defined between the first and second side rail members;
b. a plurality of mounting brackets configured for mounting the side rail main body to the vehicle, each of the plurality of mounting brackets being constructed to extend into the longitudinal opening of the side rail main body and to be secured to the main body; and
c. a plurality of step attachment arrangements provided on the second side rail member, the plurality of step attachment arrangements being constructed to receive fasteners located along the second side rail member and to provide attachment locations for one or more removable steps;
wherein the plurality of step attachment arrangements includes first, second, third, fourth, and fifth step attachment arrangements, the first step attachment arrangement being nearest the first end of the side rail main body, the fifth step attachment arrangement being nearest the second end of the side rail main body, the second, third, and fourth step attachment arrangements being between the first and fifth step attachment arrangements.

29. A modular side rail for a vehicle comprising:
a. a side rail main body having a first side rail member and a. second side rail member extending between a first end and a second end, the side rail main body having a longitudinal opening defined between the first and second side rail members;
b. a plurality of mounting brackets configured for mounting the side rail main body to the vehicle, each of the plurality of mounting brackets being constructed to extend into the longitudinal opening of the side rail main body and to be secured to the main body; and
c. a plurality of step attachment arrangements provided on the second side rail member, the plurality of step attachment arrangements being constructed to receive fasteners located along the second side rail member and to provide attachment locations for one or more removable steps;
wherein the side rail main body further includes a third side rail member adjacent the first side rail member and a fourth side rail member adjacent the second and third side rail members.

30. A modular side rail for a vehicle comprising:
a. a side rail main body having a first side rail member and a. second side rail member extending between a first end and a second end, the side rail main body having a longitudinal opening defined between the first and second side rail members;
b. a plurality of mounting brackets configured for mounting the side rail main body to the vehicle, each of the plurality of mounting brackets being constructed to extend into the longitudinal opening of the side rail main body and to be secured to the main body; and
c. a plurality of step attachment arrangements provided on the second side rail member, the plurality of step attachment arrangements being constructed to receive fasteners located along the second side rail member and to provide attachment locations for one or more removable steps;
wherein the plurality of mounting brackets are spaced along and secured to the side rail main body; and
wherein each of the plurality of mounting brackets is welded to the first side rail member and welded to the second side rail member.

31. A modular side rail for a vehicle comprising:
a. a side rail main body having a first side rail member and a second side rail member extending between a first end and a second end, the side rail main body having a longitudinal opening defined between the first and second side rail members;
b. a plurality of mounting brackets configured for mounting the side rail main body to the vehicle, each of the plurality of mounting brackets being constructed to extend into the longitudinal opening of the side rail main body and to be secured to the main body;
c. a plurality of step attachment arrangements provided on the second side rail member, the plurality of step attachment arrangements being constructed to receive fasteners located along the second side rail member and to provide attachment locations for one or more removable steps; and
d. a pinch plate constructed to receive and engage with the one or more fasteners.

\* \* \* \* \*